US012238342B2

(12) United States Patent
Cheong et al.

(10) Patent No.: US 12,238,342 B2
(45) Date of Patent: *Feb. 25, 2025

(54) VIDEO COMPRESSION WITH IN-LOOP SUB-IMAGE LEVEL CONTROLLABLE NOISE GENERATION

(71) Applicant: Apple Inc., Cupertino, CA (US)

(72) Inventors: Hye-Yeon Cheong, Los Gatos, CA (US); David W. Singer, San Francisco, CA (US); Alexandros Tourapis, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,644

(22) Filed: Jul. 18, 2022

(65) Prior Publication Data

US 2022/0353543 A1 Nov. 3, 2022

Related U.S. Application Data

(63) Continuation of application No. 17/029,649, filed on Sep. 23, 2020, now Pat. No. 11,395,008.

(Continued)

(51) Int. Cl.
*H04N 19/82* (2014.01)
*H04N 19/107* (2014.01)
(Continued)

(52) U.S. Cl.
CPC ........... *H04N 19/82* (2014.11); *H04N 19/107* (2014.11); *H04N 19/137* (2014.11); *H04N 19/182* (2014.11); *H04N 19/186* (2014.11)

(58) Field of Classification Search
CPC .... H04N 19/107; H04N 19/70; H04N 19/117; H04N 19/182; H04N 19/186;
(Continued)

(56) References Cited

U.S. PATENT DOCUMENTS 5,757,976 A * 5/1998 Shu ...................... H04N 1/4052
382/237
10,477,235 B2 * 11/2019 Peng ...................... H04N 19/23
(Continued)

FOREIGN PATENT DOCUMENTS

JP     2014121051 A  * 12/2012
WO   WO-2014144443 A2  *  9/2014  .............. G06T 5/20
WO   WO 2019166317        9/2019

OTHER PUBLICATIONS

Masahiko Toshi Translation of JP2014121051A, Dec. 19, 2012 (Year: 2012).*

(Continued)

*Primary Examiner* — Zaihan Jiang
(74) *Attorney, Agent, or Firm* — Fish & Richardson P.C.

(57) ABSTRACT

A system comprises an encoder configured to compress video data using an in-loop noise generation process that generates noise in the compression loop at a sub-image portion level of granularity, such as at a block level. The encoder includes noise model and/or noise model input parameter information in an encoded bit stream. Also, a system includes a decoder configured to receive such a bit stream and decompress the video using an in-loop noise generation process that generates noise in the decompression loop at a sub-image portion level of granularity.

18 Claims, 16 Drawing Sheets

Related U.S. Application Data

(60) Provisional application No. 62/904,576, filed on Sep. 23, 2019.

(51) Int. Cl.
*H04N 19/137* (2014.01)
*H04N 19/182* (2014.01)
*H04N 19/186* (2014.01)

(58) Field of Classification Search
CPC .... H04N 19/137; H04N 19/176; H04N 19/82; H04N 19/136
See application file for complete search history.

(56) References Cited

U.S. PATENT DOCUMENTS

| | | | | |
|---|---|---|---|---|
| 11,395,008 | B2 | 7/2022 | Cheong et al. | |
| 2004/0234243 | A1* | 11/2004 | Kondo | H04N 5/945 |
| | | | | 386/E5.036 |
| 2004/0237103 | A1* | 11/2004 | Kondo | H04N 21/6582 |
| | | | | 348/E5.077 |
| 2006/0256871 | A1* | 11/2006 | Boyce | H04N 19/136 |
| | | | | 375/E7.161 |
| 2007/0047658 | A1* | 3/2007 | Tourapis | H04N 5/21 |
| | | | | 348/E5.077 |
| 2007/0058866 | A1* | 3/2007 | Boyce | H04N 19/176 |
| | | | | 375/E7.19 |
| 2008/0252781 | A1* | 10/2008 | De Waele | H04N 19/85 |
| | | | | 348/E5.009 |
| 2009/0244331 | A1* | 10/2009 | Suzuki | H04N 25/633 |
| | | | | 348/E9.037 |
| 2012/0076430 | A1* | 3/2012 | Segall | G06T 5/75 |
| | | | | 382/233 |
| 2012/0189216 | A1* | 7/2012 | Segall | G06T 5/70 |
| | | | | 382/232 |
| 2013/0136171 | A1* | 5/2013 | Lee | H04N 19/51 |
| | | | | 375/240.03 |
| 2014/0169480 | A1* | 6/2014 | Lachine | H04N 19/14 |
| | | | | 382/246 |
| 2017/0302929 | A1* | 10/2017 | Chen | H04N 19/176 |
| 2019/0281310 | A1* | 9/2019 | Lee | H04N 19/117 |
| 2020/0349675 | A1* | 11/2020 | Park | G06T 7/11 |
| 2021/0092459 | A1 | 3/2021 | Cheong et al. | |

OTHER PUBLICATIONS

Chono et al., "Description of Video Coding Technology Proposal by NEC Corporation," Joint Collaborative Team on Video Coding (JCT-VC) of ITU-T SG16 WPS and ISO/IEC JTC1/SC29/WG11, JCTVC-A104, Dresden, DE, Apr. 15-23, 2010, 57 pages.

Gomila et al., "SEI message for film grain encoding: syntax and results," Joint Video Team (JVT) of ISO/IEC MPEG & ITU-T VCEG (ISO/IEC JTCI/SC29/WG11 and ITU-T SG16), JVT-1013r2, San Diego, CA, Sep. 2-5, 2003, 11 pages.

International Preliminary Report on Patentability in International Appln. No. PCT/US2020/052182, mailed Apr. 7, 2022, 9 pages.

Norkin et al., "Film Grain Synthesis for AV1 Video Codec," 2018 Date Compression Conference, Mar. 27, 2018, 10 pages.

PCT International Search Report and Written Opinion in International Appln. No. PCT/US2020/052182, mailed Jan. 14, 2021, 16 pages.

Wige et al., "In-Loop Noise-Filtered Prediction for High Efficiency Video Coding," IEEE Transactions on Circuits and Systems for Video Technology, Jul. 1, 2014, 24:1142-1155.

* cited by examiner

VIDEO COMPRESSION WITH IN-LOOP SUB-IMAGE LEVEL CONTROLLABLE NOISE GENERATION

PRIORITY

This application claims priority to and the benefit of U.S. patent application Ser. No. 17/029,649, filed Sep. 23, 2020, which claims priority to and the benefit of U.S. Provisional Patent Application No. 62/904,576, filed Sep. 23, 2019, the entire contents of which is incorporated herein by reference.

TECHNICAL FIELD

This disclosure relates generally to compression and decompression of video data using in-loop noise generation controllable at an image portion level.

BACKGROUND

Various devices, including but not limited to personal computer systems, desktop computer systems, laptop and notebook computers, tablet or pad devices, digital cameras, digital video recorders, and mobile phones or smart phones, may include software and/or hardware that implement a video processing method. For example, a device may include an apparatus (e.g., an integrated circuit (IC), such as a system-on-a-chip (SOC), or a subsystem of an IC), that may receive and process digital video input from one or more sources and output the processed video information, e.g. pictures/frames or regions of a picture/frame, according to one or more video processing methods. As another example, a software program may be implemented on a device that may receive and process digital video input from one or more sources and output the processed video frames according to one or more video processing methods.

In some video processing methods, to perform the processing, each input video picture/frame is divided into rows and columns of blocks of pixels (e.g., 16×16 pixel blocks). Each block of an input video picture/frame may be processed separately, and when done the processed blocks are combined to form the output video frame. This may be referred to as a block processing method.

A block processing method may include multiple processing steps or operations that are applied sequentially to each block in a video picture/frame.

SUMMARY

In some embodiments, a system for encoding video image data is configured to compress pixel value data for a plurality of images included in a plurality of frames of a video, wherein as part of the compression, the system performs in-loop noise estimation and generation at an image portion level of granularity. Supported levels of granularity may include a macroblock, Coded Tree Unit (CTU), Coding Unit (CU), Prediction Unit (PU), Transform Unit (TU), Noise Block or Region Unit (which may overlap multiple macroblocks, CTUs, CUs, PUs, TUs etc.), or other block coding units that may be supported by a coding technology. In some embodiments, techniques as described herein may be added as an extension to an existing video coding standard (e.g. in a new profile) or may be included in new video coding standards, such as MPEG VVC/H.266, AOM's AV2, or other such coding standards or technologies.

To perform the in-loop noise estimation and generation, the system is configured to determine a first noise pattern to be generated for a first portion of a given one of the images, determine a second noise pattern to be generated for a second portion of the same given one of the images, and generate, via an in-loop noise generator included in a compression loop for compressing the pixel value data, the first noise pattern and the second noise pattern, wherein the first and second noise patterns are different. Furthermore, the system is configured to encode the compressed pixel value data for the plurality of images, wherein an encoded bit stream for the compressed pixel value data includes data indicating a noise model or one or more noise parameters used to generate the first noise pattern and the second noise pattern. In some embodiments, the first and second portions of the given image may correspond to a block, CTU, CU, PU, noise block or region unit, etc. that overlaps multiple blocks or CTUs, etc. A noise pattern may include a pattern of noise samples that result from one or more inputs being used by a noise model to generate the noise pattern. A noise pattern generated at an image-portion level of granularity may have the same size/shape as portion (e.g. block, region, etc.) of the image that it is being generated for.

In some embodiments, the first and second (or additional) noise patterns may be added to residual values computed in the compression loop that are also added to predicted pixel values. In some embodiments, the noise patterns may be combined, at a block level, with predicted pixel values that have been adjusted based on residual values, before the adjusted predicted pixel values (e.g. predicted pixel values adjusted based on residual values) are further filtered by one or more in-loop filters included in the compression loop, such as a deblocking filter, sample adaptive offset (SAO) filter, adaptive loop filter (ALF), bilateral filter, or other in-loop filter. Conversely, in some embodiments, the first and second (or additional) noise patterns may be added at a block level after residual adjusted predicted pixel values have been filtered by one or more in-loop filters included in the compression loop, such as a deblocking filter, sample adaptive offset (SAO) filter, adaptive loop filter (ALF), bilateral filter, or other in-loop filter. For example, each sample included in a noise pattern may be added to each corresponding sample of a block. This process may be repeated for each color component of a plurality of color planes. Also, in some embodiments, noise may be added to one or more color components without being added to other color components.

In some embodiments, a system for decoding an encoded bit stream of compressed video data is configured to perform in-loop noise estimation and generation at an image portion level of granularity as part of decompressing the compressed video data. For example, the system is configured to receive an encoded bit stream for a compressed image or region of a video, wherein the encoded bit stream comprises data indicating a noise model or noise parameters to be used to generate noise for two or more portions of a decompressed version of the compressed image or region. The system is further configured to generate, via an in-loop noise generator, based on the data indicating the noise model or noise parameters, a first noise pattern for a first one of the portions and a second noise pattern for the second one of the portions. Also, the system is configured to add the first noise pattern to predicted pixel values corresponding to the first portion of the decompressed version of the compressed image and add the second noise pattern to predicted pixel values corresponding to the second portion of the decompressed version of the compressed image.

In some embodiments, the first and second (or additional) noise patterns may be added to residual values computed in a decompression loop that are also added to predicted pixel values. In some embodiments, the noise patterns may be combined, at a block level, with predicted pixel values that have been adjusted based on residual values, before the adjusted predicted pixel values (e.g. predicted pixel values adjusted based on residual values) are further filtered by one or more in-loop filters included in the decompression loop, such as a deblocking filter, sample adaptive offset (SAO) filter, adaptive loop filter (ALF), bilateral filter, or other in-loop filter. Conversely, in some embodiments, the first and second (or additional) noise patterns may be added at a block level after residual adjusted predicted pixel values have been filtered by one or more in-loop filters included in the decompression loop, such as a deblocking filter, sample adaptive offset (SAO) filter, adaptive loop filter (ALF), bilateral filter, or other in-loop filter.

Figure 1:
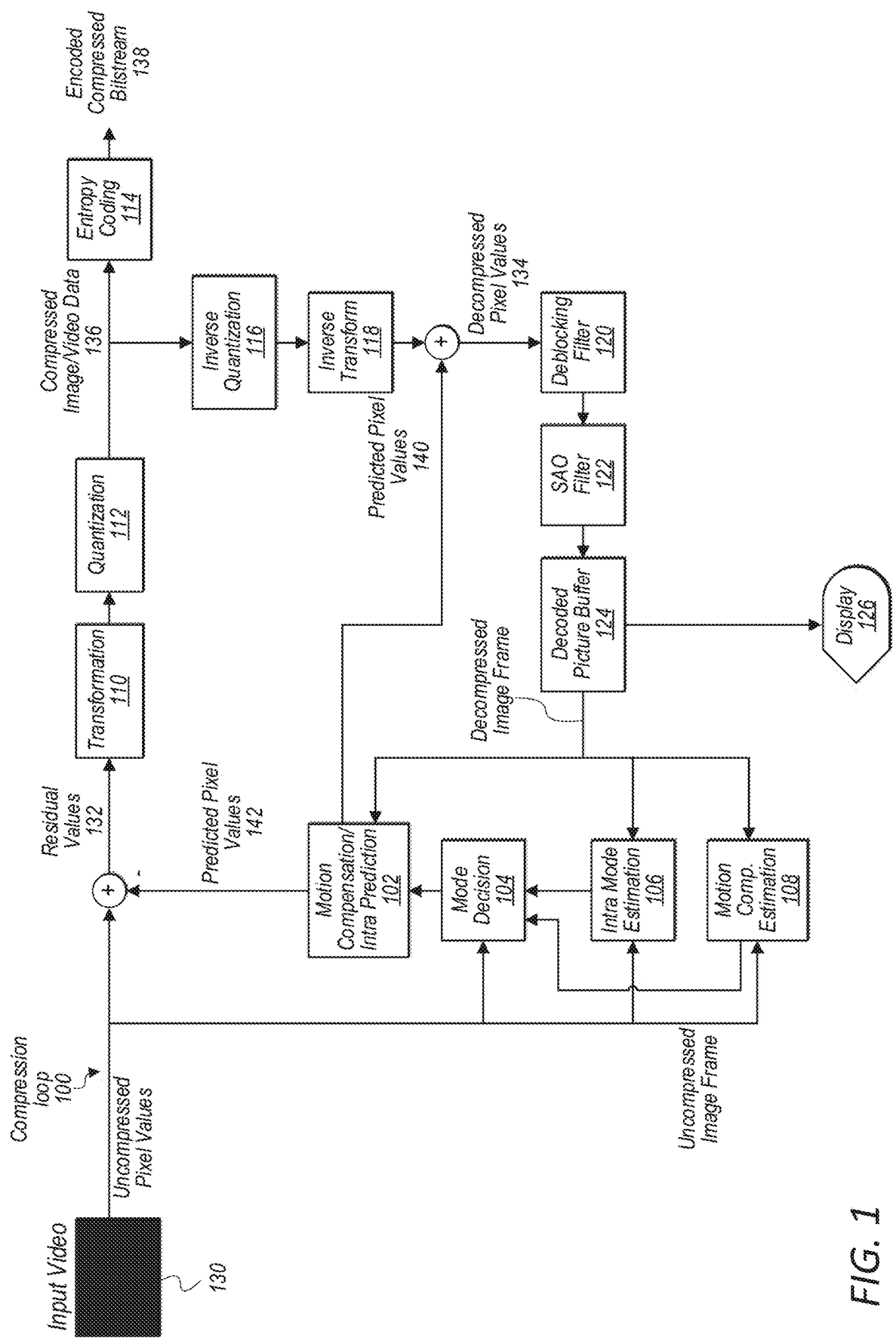
FIG. 1 illustrates an example video compression loop of an encoder, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Natural scenes typically do not include noise. However video images or still images that capture a natural scene may include noise. For example, when dealing with dark content, such as images capturing a natural scene with low light, noise is often captured in the images along with the natural scene. For example, thermal noise or noise introduced via a light sensor, etc. may be captured. Additionally, depending on the medium used to capture the natural image, other types of noise, such as film grain noise may be captured.

For various reasons, it may be desirable to maintain or recreate the noise included in a captured image after the image has been compressed and decompressed. For example, film grain noise may be a desired feature of the video in order to replicate older movies, artistic intent, etc. However, current video compression algorithms either remove noise in the compression and decompression process or fail to realistically recreate noise in a decompressed version of an image or video.

For example, some video compression/decompression systems may add noise to a decompressed image at a full frame level of granularity. This may be done by specifying a noise model, commonly associated with each frame of the sequence, e.g. using a Film Grain SEI mechanism in a codec such as MPEG-4 AVC/H.264 or HEVC/HEVC, and using this model to generate the noise that is to be added onto the current frame. The amount and type of noise to be added may be further modulated according to the region characteristics, e.g. brightness of the region where the noise is to be added. However, the noise model does not change, whereas the amount and type of noise typically varies within an image frame such that a one-size fits all frame level noise model fails to realistically recreate noise included in an original image.

In some embodiments a video encoder or decoder may include an in-loop noise estimator and/or in-loop noise generator that selects noise models and/or model parameters at a sub-image portion level of granularity, wherein different noise models and/or parameters may be applied to different portions of an image within the same image frame. For simplicity the term image frame is used herein. However, in some embodiments, similar processes could be carried out for a picture, which may include interlaced images, such as field and frame pictures. In some embodiments, sub-image level noise may be added in the compression loop or decompression loop upstream or downstream of in-loop filters, such as a deblocking filter or a sample adaptive offset (SAO) filter.

Also, in some embodiments, optional denoising filters may be included in a compression or decompression loop to remove noise. In some embodiments, removing noise from the compression loop may improve compression efficiency by removing noise from residual values and thus reducing the number of bits required to encode the residual values or equivalently compressing these residual values at a higher quality.

In some embodiments, a controlled denoising filter may be included in a compression/decompression loop to remove noise to improve compression efficiency. In some embodiments, the controlled denoising filter may be controlled such that the filter is adjusted to remove noise similar to noise being added at another location in the compression or decompression loop. For example, information such as noise parameters, indicating a selected noise model/noise parameters that is used to generate in-loop noise, may also be provided to a controlled de-noising filter to select an appropriate filter to remove the generated noise.

Example Compression Loop/Encoder

For example, FIG. 1 illustrates compression loop 100 that receives input video data 130. Some portion of the input video data 130 is used to determine predicted pixel values via intra-prediction module and/or motion estimation/compensation module 102. The predicted values 142 are compared to original pixel values in the input video data 130 to determine residual values 132 (e.g. differences between the predicted pixel values and the pixel values of the input video data 130). The residual values 132 are further processed via a transformation module 110 and quantization module 104 and output as compressed image/video data 136. The transformed/quantized residual values (e.g. compressed image/video data 136) is entropy encoded via entropy encoding module 114 and output as an encoded compressed bit stream 138.

Compression loop 100 also includes an inverse quantization module 116 and an inverse transformation module 118. The inverse quantization module 116 and the inverse transformation module 118 reconstruct the residual values, such that they are similar to the residual values 132 prior to passing through transformation module 110 and quantization module 112. For example, the inverse quantization/inverse transform modules undo the transformations and quantizations that were applied at transformation module 110 and quantization module 112. Except the output of the inverse transformation module 116 may include any distortion introduced as a result of the transformation and quantization of the residual values. The output of the inverse transformation module 116 is combined with predicted pixel values 140 from motion compensation/intra prediction module 102 to generate a reconstructed version of the original pixel values (e.g. decompressed pixel values 134). The decompressed pixel values 134 are further processed by in loop filters, such as deblocking filter 120 and sample adaptive offset (SAO) filter 122. Reconstructed image frames comprising the decompressed pixel values 134 that have been filtered by deblocking filter 120 and SAO filter 122 are stored in decoded picture buffer 124.

The images in the decoded picture buffer 124 may be used as an input to estimate distortion of intra-mode compression. For example, intra-mode estimation module 106 may utilize a previously encoded region from the current image that is also stored in the decoded picture buffer 124, to estimate distortion as compared to an uncompressed region in the current image frame.

As used herein, intra-mode compression refers to compression using predicted values and residual values determined within an image frame based on values of other pixels in the same image frame. For example, an intra-mode compression technique may take a subset of pixel values of an image and explicitly include the subset. In some embodiments, the sub-set may be a single starting pixel value or set of pixel values. Additionally, the intra-prediction technique uses these starting pixel values to predict pixel values of neighboring pixels. Such a process may be iterative and may proceed block by block wherein pixel values are predicted for a block at a time. These predicted pixel values may then be compared to actual pixel values of the image to determine residual values. The residual values may then be encoded for use by a decoder to correct predicted pixel values generated using the same or a similar prediction process.

In contrast, as used herein, inter-prediction refers to compression techniques that utilize differences between image frames, such as due to temporal changes, to predict pixel values. For example, motion estimation and motion vectors may be used in an inter-prediction method to estimate and indicate motion of blocks or other sub-units of an image between image frames (e.g. temporal differences). These motion vectors may then be used to predict pixel values for subsequent image frames relative to a reference image frame, wherein the predicted pixel values compensate for the motion between image frames.

The images in the decoded picture buffer 124 may be used by motion compensation estimation module 108 to determine estimated motion and/or distortion between an uncompressed image frame and a reconstructed image frame, wherein the reconstructed image frame is compressed and decompressed using inter-compression techniques such as motion estimation and compensation.

The estimated distortion and/or compression efficiency determined by intra-mode estimation module 106 and motion compensation estimation module 108 may be provided to mode decision module 104, wherein mode decision module 104 selects whether to compress a given image region or even an entire frame using an intra-prediction technique or an inter-prediction technique.

In some embodiments, a device, such as a mobile device with a screen and camera that is capturing an image or video that is being compressed, may also display the video image. For example, reconstructed image frames stored in decoded picture buffer 124 may further be provided to display 126 for rendering on a display.

Traditionally, image and video coding schemes perform prediction as described above (either intra-prediction or inter-prediction) on a region of an image to be compressed and encoded. For example, such as a block area of size M×N. Previously encoded samples, such as other blocks in the same image may be used in an intra-prediction technique, whereas corresponding blocks in other image frames at different times may be used in an inter-prediction technique.

In some embodiments, transformations applied to residual values, such as via transformation module 110, may include an inverse discrete cosine transform, or other suitable transform.

In some embodiments, the in-loop filters, such as deblocking filter 120, SAO filter 122, and/or additional in-loop filters may be applied on a portion of an image (e.g. a block) as well as neighboring portions of the image (e.g. neighboring blocks). The in-loop filters may reduce possible coding/compression artifacts that the coding/compression process may have introduced.

The encoded compressed bit stream 138 may include any information needed to reconstruct the portions (e.g. blocks) of an image being compressed and encoded, such as partitioning information, an indication of the prediction mode selected, and its associated information, e.g. motion vectors and reference indices, the type of the transform or transforms used, quantization parameters, as well as any remaining quantized coefficients, among others.

An inverse process, to some extent, is followed at a decoder, with first entropy decoding being performed on the compressed bit stream to derive the encoded information (partitions, modes, motion vectors/mvs, quantized coefficients, etc.), followed by the prediction process. The inverse quantization and transform steps could be performed in parallel, and the reconstructed residual is then added onto the prediction information. This reconstructed block may then be in-loop filtered given the appropriate in-loop filtering mechanisms supported and used by the underlying codec.

Although the methods described above work well for most content, there are cases in which these methods can fail to perform well, potentially resulting in poor coding performance and severe coding artifacts. This is because the methods described tend to assume that the signals are easy to predict and relatively noise free or smooth. However, quite commonly image and video data may contain noise. Commonly also such noise is not temporally correlated and can vary considerably from frame to frame. There can be different types of noise that may relate to different components of the capture and image acquisition process, including, but not only, Gaussian and shot noise, film grain, salt and pepper noise, as well as quantization noise that may be the product of an earlier compression process. Noise may have also been added as an "artistic" component during the content creation process or to potentially reduce artifacts, such as banding, that may have existed in the source or may have been introduced to the content due to additional processing steps such as bit depth reduction or compression. The amount and the characteristics of the noise signal in the image may be quite different from region to region and could depend on multiple parameters including intensity, motion, color, etc.

Some systems try to deal with noise in the image or video content by first performing a denoising step on the actual source material, and then compressing/encoding the denoised content. The removed noise is also modeled in the encoder, and certain parameters that could allow the decoder to synthesize a similar noise pattern are then signaled in the bit stream. Such models are supported in both AVC and HEVC using the film grain modeling supplemental enhancement information (SEI) messages, while also AV1 also has a similar process for modeling and adding noise onto the signal after the decoding process. However, these models add the noise outside of the coding loop. Also, in these methods their parameters are global (i.e. at the sequence or frame level) and there is no capability of signaling any control parameters at a local, e.g. block, level.

In these systems, combining for example two images with different noise characteristics into a single image, e.g. a montage, and coding them as a single image afterwards would imply that it is not possible to consider different noise models for the regions corresponding to the two different sub-images. The noise is designed to resemble the overall characteristics of the noise in the entire image, and cannot be locally adapted. In images with varying degrees of noise, this may result in inaccurate noise modeling that would result in an image that might not subjectively resemble the original image prior to noise removal.

Example Compression Process with Out-of-Loop Noise Modeling

Figure 2:
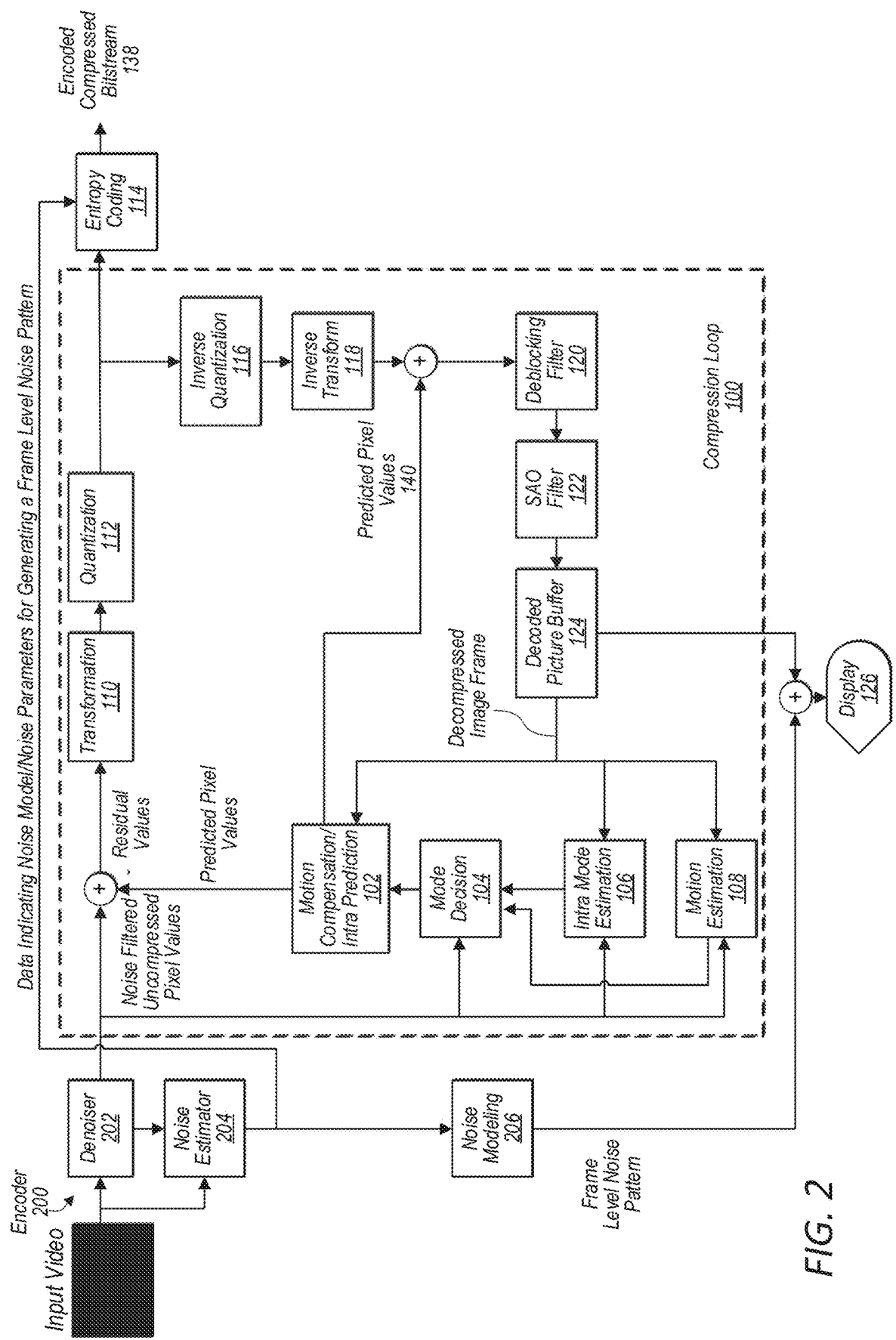
FIG. 2 illustrates an example video encoder that includes out-of-loop frame level noise generation, according to some embodiments.

For example, FIG. 2 illustrates an encoder 200 that includes a compression loop similar to compression loop 100. However, encoder 200 includes out-of-loop noise generation via noise modeling module 206 that is outside of the compression loop 100. For example, input video data 130 is filtered via denoiser 202 prior to entering the compression loop 100. Additionally, the filtered video data is compared to input video data 130 at noise estimator 204 (out-of-loop) to determine frame level noise parameters such as which noise model to use to model the removed noise and which parameters to use in the selected model. This information is provided to entropy coding unit 114 to be included with encoded bit stream 138. However, as noted before, this frame level information does not allow for sub-image portion noise generation control and is added to a full frame after the frame has been reconstructed, as opposed to being added to a sub-image portion prior to image frame reconstruction.

In some encoding devices, that further include a display, such as display 126, a noise modeling module 206 may generate a noise frame comprising a frame level noise pattern and add the frame level noise pattern to a reconstructed image frame from decoded picture buffer 124 prior to providing the reconstructed image frame for rendering on display 126. In some embodiments, the noise modeling module 206 may also receive (not shown) information about preceding image frames from decoded picture buffer 124 as an input to a noise model.

Example Decompression Process/Decoder with Out-of-Loop Noise Modeling

Figure 3:
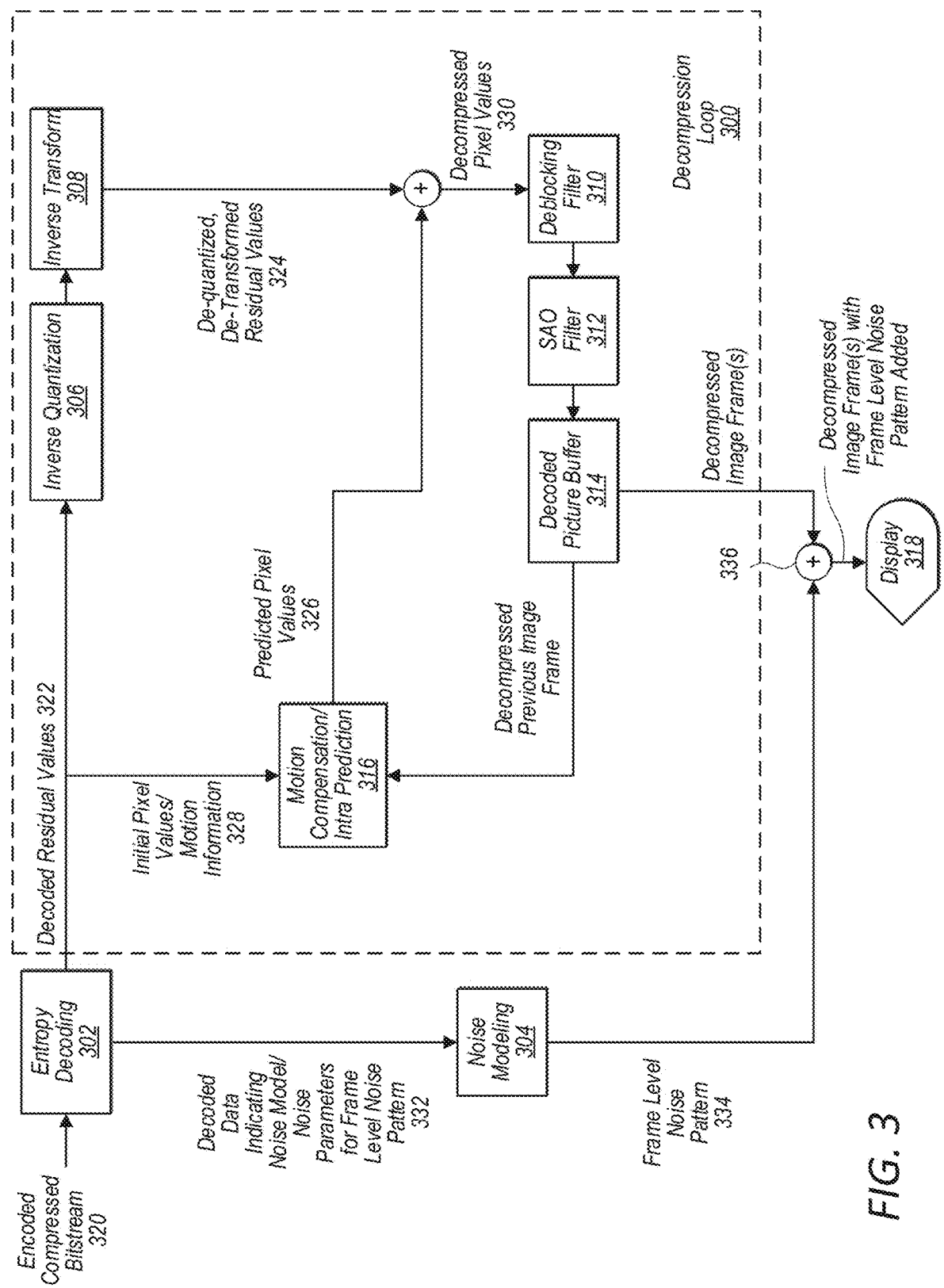
FIG. 3 illustrates an example video decoder that includes out-of-loop frame level noise generation, according to some embodiments.

FIG. 3 illustrates an example decoder that includes out-of-loop noise modeling.

Entropy decoding module 302 receives encoded bit stream 320 and entropy decodes the encoded bit stream. Decoded residual values 322 (which may be similar to residual values determined at an encoder that have been transformed and quantized, such as via transformation module 110 and quantization module 112) are processed by inverse quantization module 306 and inverse transform 308 to generate de-quantized, de-transformed residual values 324. Additionally information 328 (e.g. initial pixel values, motion vectors, etc.) is provided to motion compensation intra/prediction module 316. Information 328 may include an indication as to whether the image was compressed via intra-prediction or inter-prediction.

If compressed via intra-prediction, information 328 may include at least one or more initial pixel values for at least one pixel of a compressed image. The at least one or more pixel values may be starting values that are used to predict pixel values for other pixels via the intra-prediction process. Alternatively, if the image was compressed via inter-prediction, the information 328 may include motion vectors (mvs). Motion compensation/intra prediction module 316 may generate predicted pixel values 326, and the predicted pixel values 326 may be combined with de-quantized, de-transformed residual values 324 to yield decompressed pixel values 330. The decompressed pixel values 330 may further be filtered by one or more in-loop filters, such as deblocking filter 310 and sample adaptive offset (SAO) filter 312. The filtered decompressed pixel values are reconstructed into decompressed image frames and are stored in decoded picture buffer 314. In some embodiments, decompressed image frames from decoded picture buffer 314 may be used by motion compensation/intra-prediction module 316 to estimate motion between blocks (or other portions) of sequential image frames.

The above decompression process may be similar to various ones of the decoders described herein. However, FIG. 3 additionally illustrates out-of-loop noise modeling, wherein decoded data 332 indicating noise model/noise parameters for generating a frame level noise pattern is provided to noise modeling module 304, which generates, outside of the decompression loop 300, a noise pattern for a whole image frame. At 336, the image-frame level noise is added to a reconstructed image frame from decoded picture before 314 prior to being provided to be rendered on display 318.

In-Loop Sub-Image Portion Level Noise Modelling

In some embodiments, unlike previous systems that remove noise from the original source and perform noise modeling outside of the encoding loop, a compression/decompression process with in-loop noise generation enables the addition of noise within the image/video coding loop. Such addition may also be done and controlled at a sub-image portion level, also referred to herein as a block level, e.g. a macroblock, Coded Tree Unit (CTU), Coding Unit, Transform unit, or other block coding unit that may be supported by a coding technology.

In particular, an additional coding block may be introduced inside a video encoder and consequently, a video decoder that has the purpose of modeling and generating "controlled" noise patterns that are added onto the signal during reconstruction of an image block.

Figure 4:
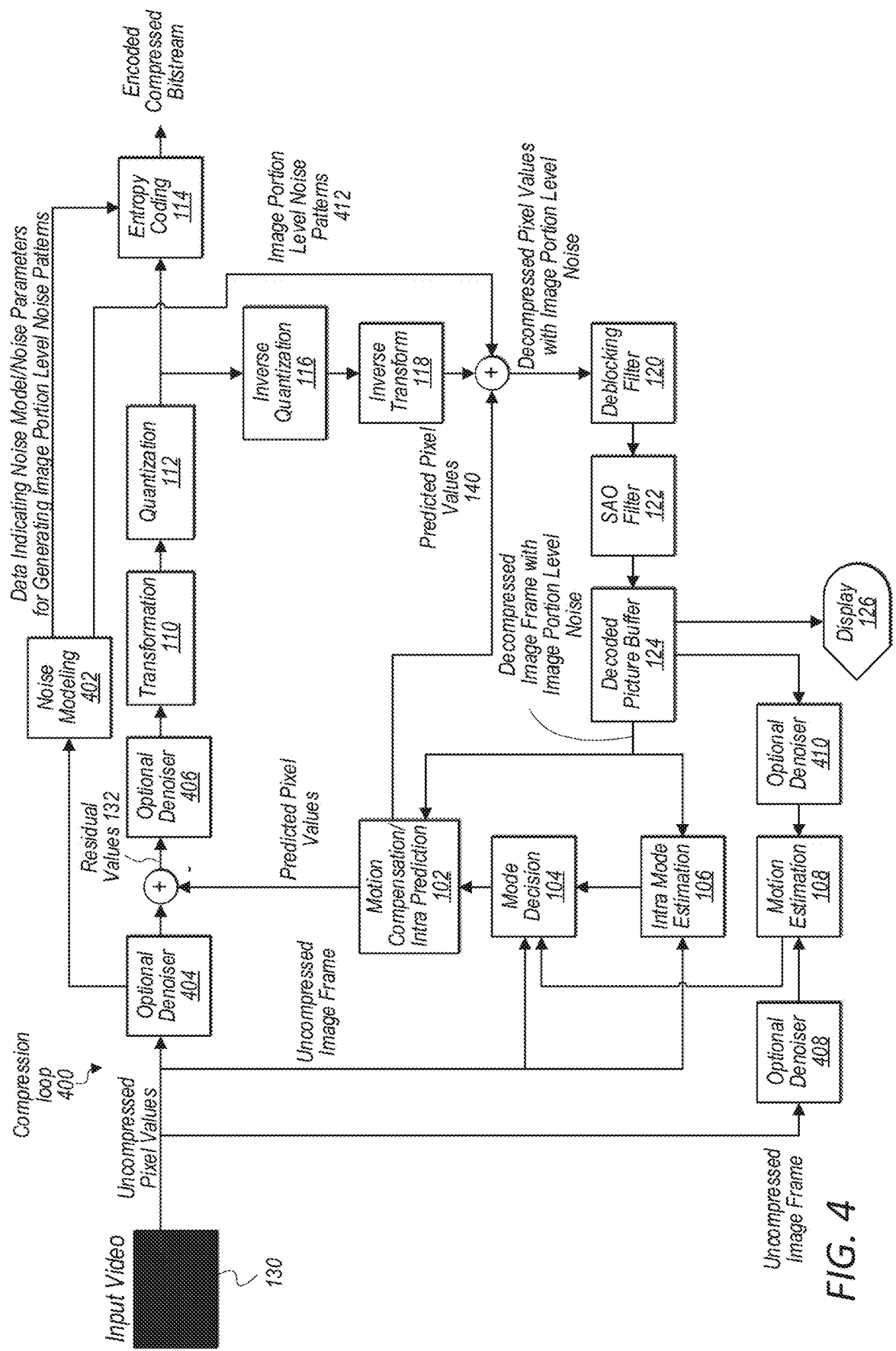
FIG. 4 illustrates an example video encoder that includes in-loop noise generation controlled at a sub-image portion granularity, according to some embodiments.

For example, FIG. 4 illustrates compression loop 400, which is similar to compression loop 100, except compression loop 400 includes optional denoisers 404, 406, 408, and 410 along with in-loop noise modeling unit 402. Input video 130 is optionally denoised at denoiser 404 prior to being used to determine residual values 132. Furthermore, residual values 132 may be denoised via denoiser 406 prior to being transformed and quantized. Additionally, an uncompressed image frame and a decompressed image frame from decoded picture buffer 124 may be denoised via optional denoisers 408 and 410 prior to being used by motion estimation module 108.

However, in contrast to noise modeling module 206 shown in FIG. 2 that is outside of compression loop 100, noise modeling module 402 is included as part of compression loop 400, wherein generated portion level noise patterns 412 are added to predicted pixel values 140 for an image portion along with inverse quantized, inverse transformed residual values for the image portion.

Figure 5:
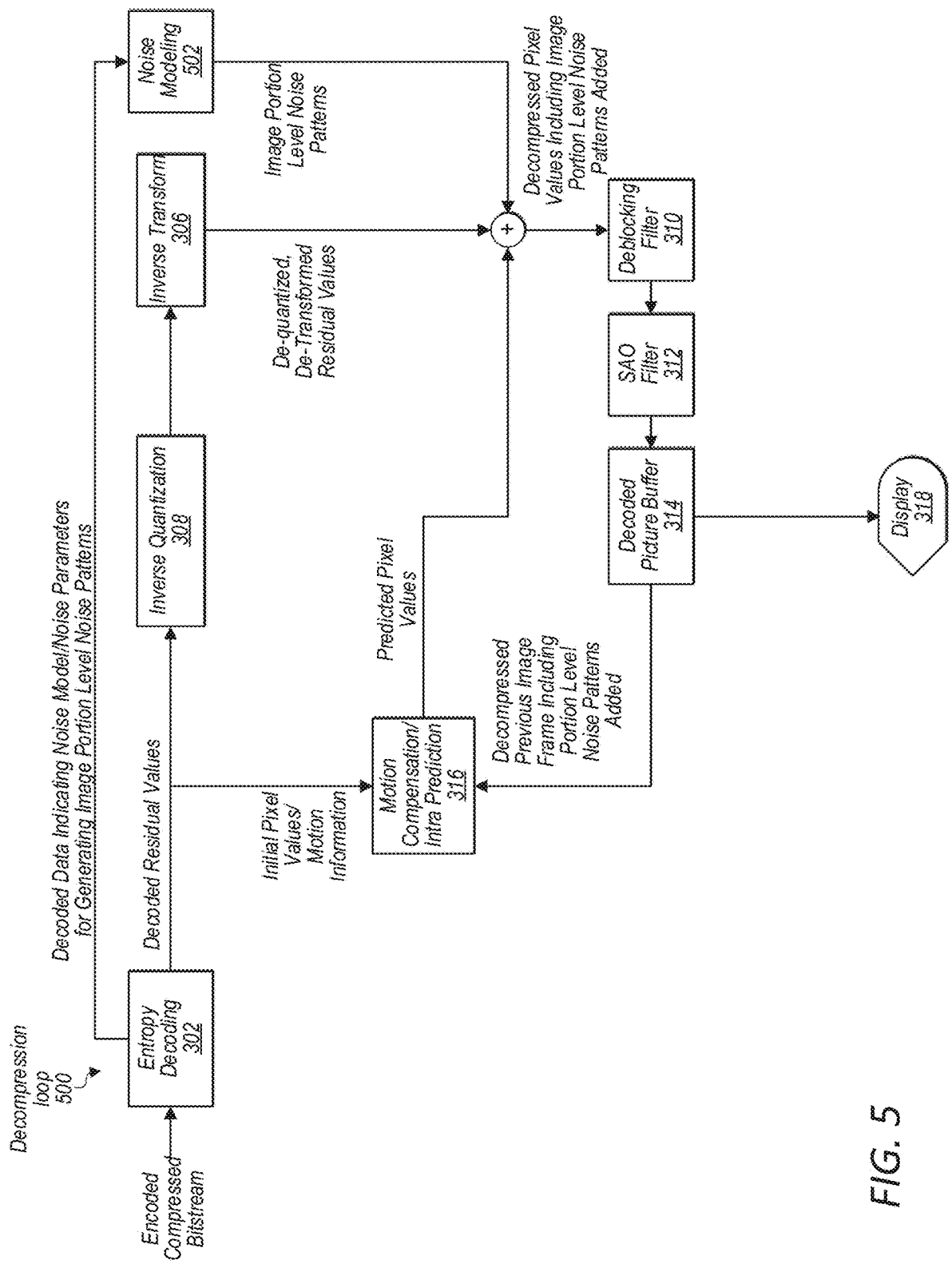
FIG. 5 illustrates an example video decoder that includes in-loop noise generation controlled at a sub-image portion granularity, according to some embodiments.

As another example, FIG. 5 illustrates decompression loop 500, which is similar to decompression loop 300, except decompression loop 500 includes noise modeling unit 502 inside the decompression loop, such that noise can be added at a sub-image portion level of granularity.

Unlike the compression and decompression loops shown in FIGS. 4 and 5, the noise generated in FIGS. 2 and 3 is essentially generated using frame level parameters and is added outside the coding loop. In contrast, the noise generated in the compression loop 400 shown in FIG. 4 and the decompression loop 500 shown in FIG. 5 is generated for and added to each block or any other coding unit that the system may support. In the compression loop 400 and the decompression loop 500, the addition and characteristics of the noise are fully controlled by parameters signaled in the bit stream, wherein the signals may be signaled for each such coding unit. For example the noise generation parameters may be signaled in a manner similar to how transform information is also associated with, and provided for, each coding unit.

In particular, the compression loop 400 and the decompression loop 500 permit the addition of "controlled noise" for each coding unit. A variety of parameters that control the presence, type, and characteristics of the noise to be added can be signaled. The coding unit can be an existing unit such as a CTU, a prediction unit, a transform unit etc., or a newly defined and independent unit that may be specified and controlled through high level syntax elements similar to how these other units as controlled. For example, a CTU, similar to how it is also split into transform units, could also be split into such units for noise addition. Splitting could be done using a hierarchical manner. For example, tree based methods could be used for splitting e.g. a quadtree, binary, ternary etc. trees. The maximum depth of such trees could be controlled through higher level syntax units, e.g. at the sequence parameter set (SPS), picture parameter set (PPS), or slice headers. Such units could also be bigger than a CTU and span across multiple CTUs so as to ensure better blending of the noise across multiple blocks. Such units may be referred to as noise portion units.

Figure 12:
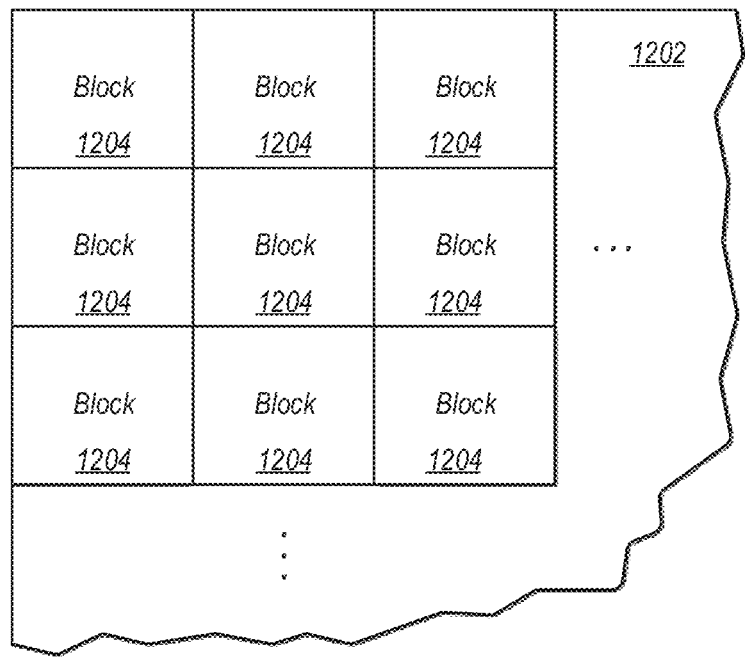
FIG. 12 illustrates an example image frame partitioned into image blocks, according to some embodiments.
Figure 13:
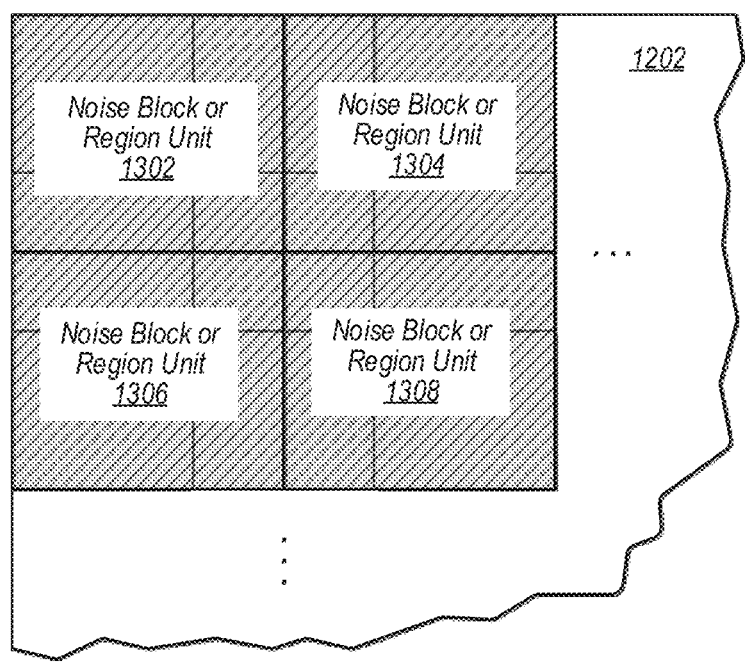
FIG. 13 illustrates an example image frame showing noise block or region units that overlap image blocks, according to some embodiments.

For example, FIG. 12 illustrates a portion of an image 1202 comprising multiple blocks 1204 and FIG. 13 illustrates noise block or region units 1302, 1304, 1306, and 1308, wherein each noise block or region unit overlaps multiple ones of the blocks 1204.

The in-loop noise generation processes discussed herein could apply to any color domain, e.g. YCbCr or RGB signals. Also, the in-loop noise generation process discussed herein could operate on a single plane, e.g. only luma (Y), or all planes, while control could be the same for all planes or different for each color plane (e.g. color component of a color space). For example, noise may only be added on the luma component while no noise is added on the chroma planes, or the noise may be modeled based on the luma component and then scaled or appropriately adjusted for the other color planes based on a fixed relationship or based on the relationship of the luma and chroma values before the addition of any noise (e.g. data channel of reconstructed luma vs data channel of reconstructed chroma before noise addition; such values could be used to determine a scaling factor for the noise added in the chroma planes, e.g. based on the ratio of those two quantities). Different control could also be applied on different types of content, e.g. whether the content is Standard or High Dynamic range content, in video or full range, with standard/limited or wide color gamut, whether the content is classified as natural content or synthetic, whether it is regular or point cloud projected content (e.g. in the context of a point cloud system based on the video point cloud compression (V-PCC) compression technology) etc.

For each noise block or region unit (e.g. block, CTU, etc.) the following may be signaled in the bit stream:

Presence of noise. If noise is not present, then no additional parameters need to be sent. This could be a flag, or could be a parameter that also shows the type of noise to be added (as explained in the next bullet).

If noise is present, then the type of noise to be added, and possibly the noise model to be used to generate the type of noise. For example, the noise to be added may follow a Gaussian or laplacian model, generalized Gaussian, uniform, gamma, the perlin noise etc. All of these noise models could be associated with a syntax element, e.g. block_noise_model. For example, if this parameter is set to 0, no noise will be added. If the parameter is set to 1, then a Gaussian model for the noise will be used, if 2, then a uniform noise model will be used etc.

Depending on the noise model, then additional parameters may be sent. For example, for a Gaussian model the mean value of the noise and its standard deviation could be signaled. For a noise model that follows a generalized power distribution model parameters such as the alpha and beta parameters, in addition to the mean may also be signaled. Another model may utilize a transform domain, e.g. discrete cosine transform (DCT) based, noise generation process, while another may use a recursive based model. Noise may also be generated using appropriately defined polynomials/linear-feedback shift registers (LSFR). LFSR methods are rather commonly used for the generation of uniform distribution and pseudo random Gaussian distribution noise models. For such polynomials, the order and coefficients of the polynomial may be signaled as well as the initial (seed value) needed by the polynomial. Such information may also be shared across neighboring blocks. In that case, the filter parameters could also be predicted from its neighborhood so as to reduce overhead. For example, for a block it may be signaled that the noise to be added relates to the noise added in one of its neighbors, e.g. the block on the left or on the top. In that case, no additional parameters may need to be signaled, or the parameters that are signaled for the current block may be "predicted" from those of its neighbor(s). A most probable noise model could also be used based on the neighborhood to further reduce overhead. The position order of the noise could also be signaled or be predetermined. For example, a raster scan or a zig-zag scan order could be used for the generation and addition of the noise. The noise block could also be seen as a "noise transform block" that like a DCT or other transform block, which generates a noise pattern, in its appropriate specified domain and "transformation model", e.g. the LFSR model. The same model would be available in the decoder and operate in the same way, e.g. both encoder and decoder noise models included in the encoder's noise modeling module and the decoder's noise modeling module.

In some embodiments, the value of the noise to be added could be agnostic and independent from the signal that it is to be added on. In an alternative embodiment, the noise could also depend on the characteristics of that block. Such characteristics could include its reconstructed overall data channel or the pixels (e.g. the noise to be added may be modulated by the data channel or by the current component value), based on the characteristics of the residual signal (again modulated by the value of each residual pixel; in this case, if the residual is 0, it might be desirable to perform the modulation using "residual+fixed-offset" value), or motion (e.g. low motion versus high motion blocks may require different noise to be added. This could be done by controlling the noise generation and weighting on the motion vectors in the bit stream). Also, different noise may be added for skip versus intra versus affine mode blocks, etc. Such weighting again could also be adjusted according to the color plane that is being processed (e.g. different noise may be generated according to the mode, motion, DC value of the block, etc. for luma versus chroma components, or such noise control parameters may be determined based on only luma to reduce complexity.

The noise to be added is determined at the encoder based on the characteristics of the source. In particular, the source could be analyzed and the noise in the signal, if any, determined, and then modeled. The encoder may try its best to recreate the noise as close to its original characteristics, but could also just approximate it. A variety of methods could be used to do so, e.g. using a least mean squares estimation method, wiener noise estimation, etc.

In some embodiments, the encoder may select to denoise the content before performing this process since it is aware that it can resynthesize noise as part of the coding loop. This process is purely optional. Denoising may happen directly on the source, e.g. in the image domain, or in the residual domain after any prediction has been performed. Such denoising in the prediction domain may also remove noise introduced through the prediction process (e.g. because of a noisy reference). Denoising could also be performed in both domains in a cascaded manner. Such steps are obviously non-normative and aim at reducing the energy of the residual signal that will be transformed and quantized. Any denoising method, including wiener filtering, bilateral filtering, motion compensated spatio-temporal filtering, wavelet based or bandlet/edgelet/ridgelet filtering, Gaussian filtering etc., or other commonly used filtering methods could be used for such process.

Additional, non-normative denoising could be applied, as shown in FIG. 4 via optional denoiser 408 and 410. For example, during the motion estimation process optional denoising could be applied to both the source signal and the references stored in the decoded picture buffer 124. This may assist the motion estimation in determining the best prediction of the actual signals in the scene (e.g. finding the "real/true" motion of the content) and not of the noise, which commonly is uncorrelated. Any denoising method, including wiener filtering, bilateral filtering, motion compensated spatio-temporal filtering, wavelet based or bandlet/edgelet/ridgelet filtering, Gaussian filtering, or other commonly used filtering methods could be used for such process. Motion compensation and the final prediction would use the unfiltered data in this scenario.

The addition of the noise may be done immediately after or at the same time that the prediction and the reconstructed (after inverse quantization and transform) residual values are added. For example, noise patterns may be added as shown in FIG. 4 after inverse transform 118. However, that implies that any subsequent processing steps, such as deblocking, sample adaptive offset filtering (SAO), adaptive loop filter (ALF), or any other in-loop filtering that the codec may support, would be applied on the signal that is the combination of the prediction, reconstructed residual, and reconstructed noise. That might be desirable under some architectures, in which case it might also be desirable to control such filtering mechanisms based on also the addition of noise to the current block but also its neighbors. In such a case, the characteristics of such in-loop filtering mechanisms could be altered so as to a) account for the noise, b) make sure they preserve the noise characteristics, and/or c) make sure that the noise is appropriately blended across block partitions.

For example, in existing deblocking schemes filtering strength is commonly determined based on the similarity of pixels and block edges. Only the row or column that is to be filtered in those cases is evaluated. Since noise is added, it might be better that, instead of considering a single column or row, evaluation of the deblocking strength be performed in a manner that considers multiple columns and rows. Effectively, one could perform a "subtle" and in place denoising of the positions to be deblocked before deblocking strength determination. Then the strength determination could be performed on such denoised pixels. Note that such denoising is only performed for deblocking strength determination and the denoised values are not used further for the reconstruction process. Similar considerations could be made for other types of filters, such as SAO, ALF, in-loop bilateral filtering, etc. For example, in the SAO case, determination of band or edge filtering, as currently is defined in HEVC, also considers a similar denoising method for the classification process. If other modes of SAO are to be used, e.g. texture mode, banding detection, etc., similar considerations could also be made.

In some embodiments, intra-prediction may be performed with or without the noise addition. This could be already predetermined at the encoder and decoder (no signaling), or the decision could be signaled also in the bit stream. Signaling could be at a high level syntax structure, e.g. SPS, PPS, or slice header, or could also be at a lower level, e.g. the CTU, or the noise block level.

Figure 6:
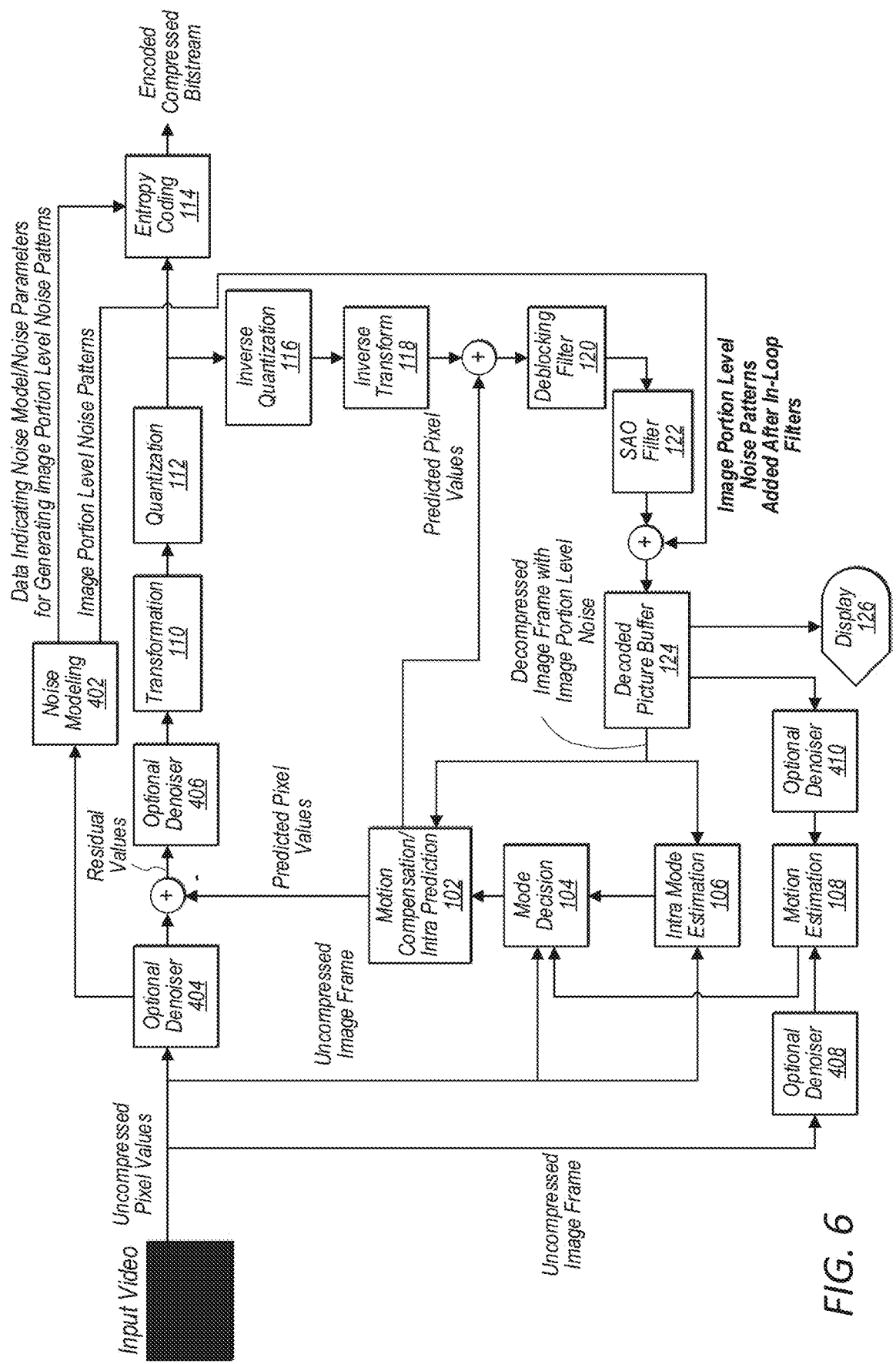
FIG. 6 illustrates an example video encoder that includes in-loop noise generation controlled at a sub-image portion granularity, wherein the generated noise is added downstream of in-loop filters, according to some embodiments.
Figure 7:
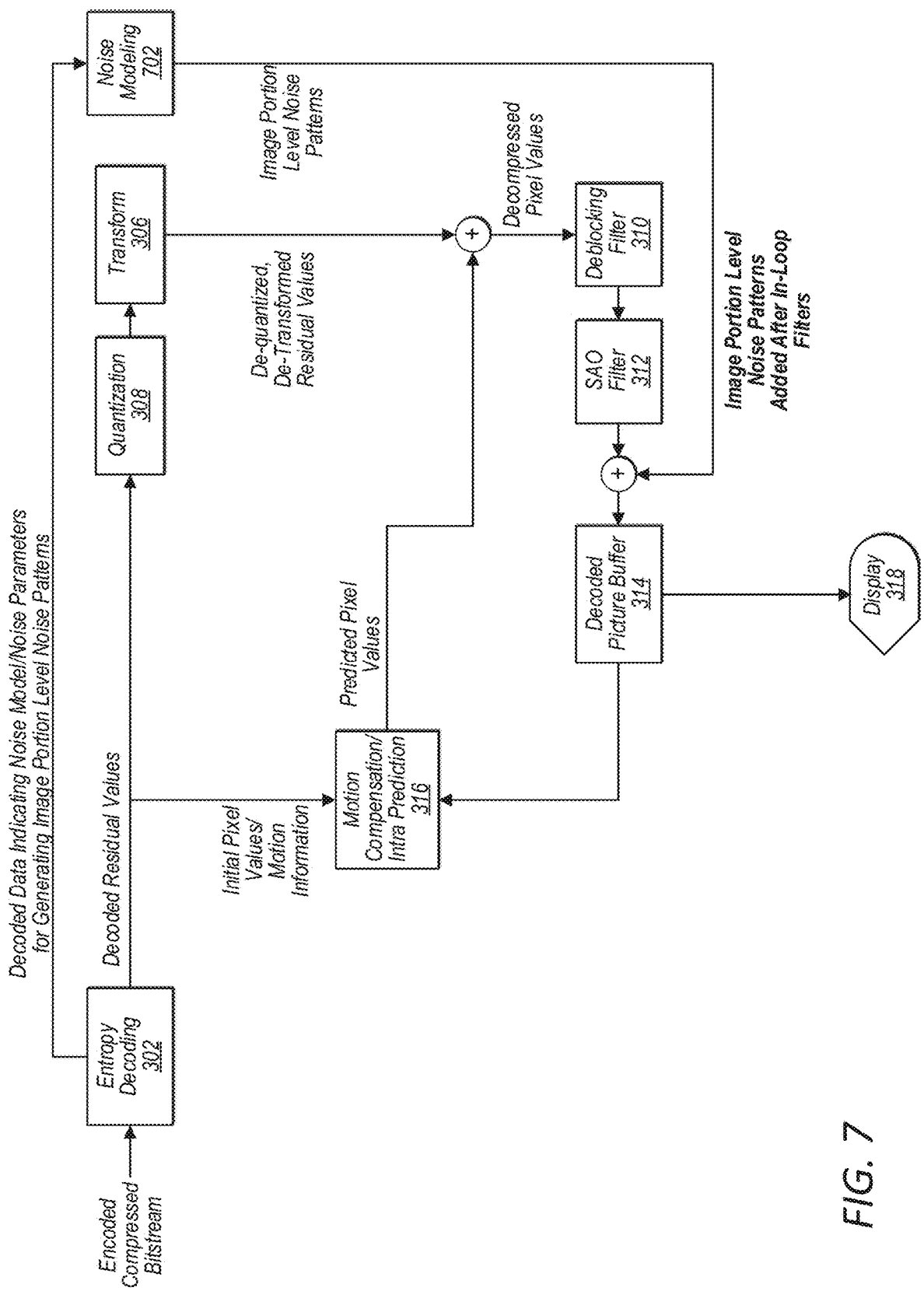
FIG. 7 illustrates an example video decoder that includes in-loop noise generation controlled at a sub-image portion granularity, wherein the generated noise is added downstream of in-loop filters, according to some embodiments.

In some embodiments a compression loop/decompression loop may function in an alternative mode wherein noise is added downstream of the in-loop filters. For example, FIG. 6 illustrates an encoder wherein noise is being added downstream of SAO filter 122. As another, example FIG. 7 illustrates a decoder wherein noise modeling module 702 is in the decompression loop and noise is being added downstream of SAO filter 312.

In some embodiments, it might be desirable to add the noise block after the in-loop filtering steps. This can avoid filtering the added noise, which may result in other types of artifacts, under some scenarios. The final signal is still added in the reference buffer for future prediction. However, unlike the previous case where intra prediction could be done with or without the noise model, commonly steps that are at the in-loop filter level are exempted from intra prediction for complexity and memory purposes. Therefore, it is recommended that also in this case the noise block is excluded from any intra prediction (including neighboring block directional prediction and intra block copy prediction) stages. Noise, however, is still considered for inter/temporal prediction.

Figure 8:
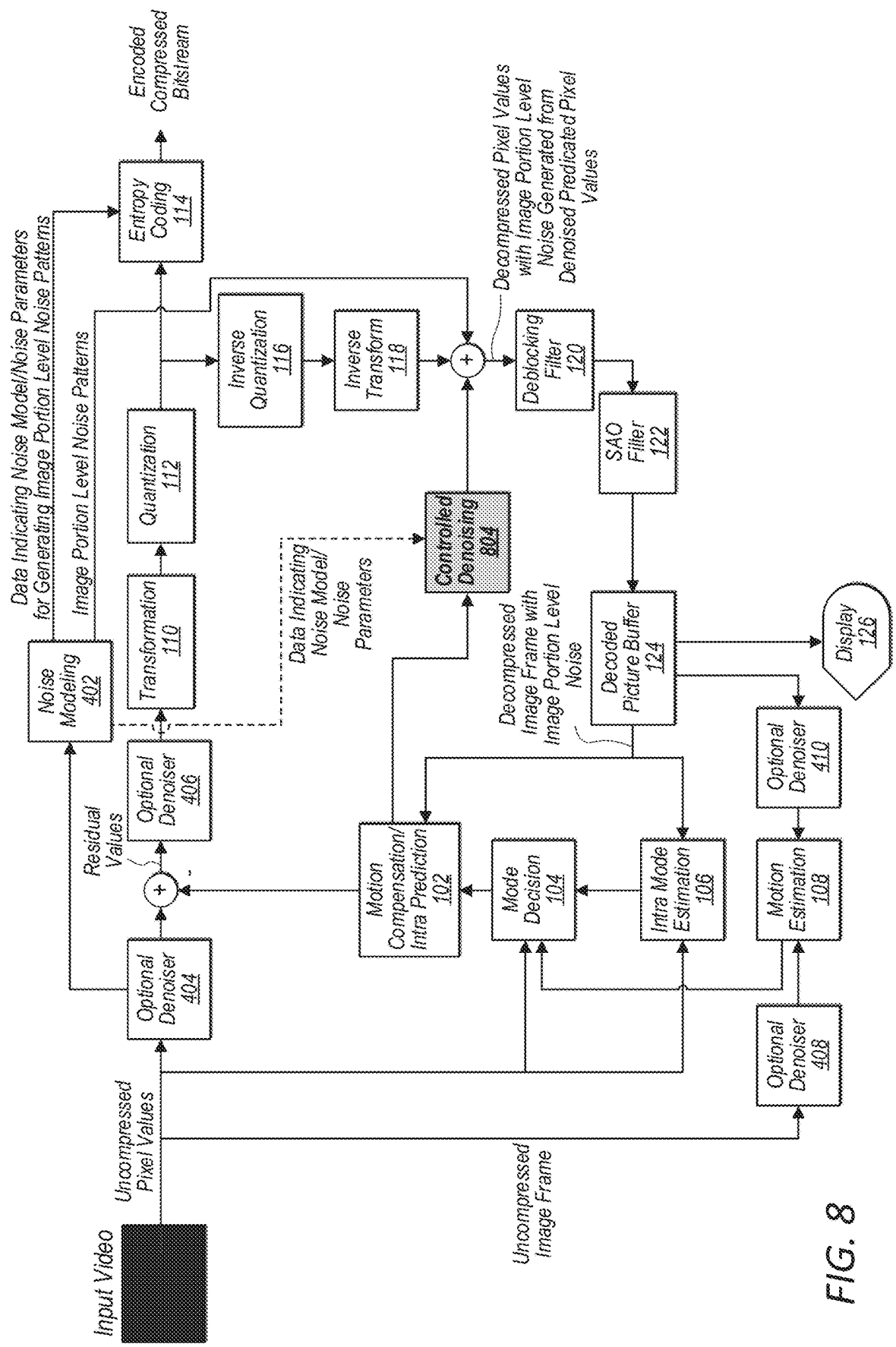
FIG. 8 illustrates an example video encoder that includes in-loop noise generation controlled at a sub-image portion granularity and that includes controlled de-noising, according to some embodiments.
Figure 9:
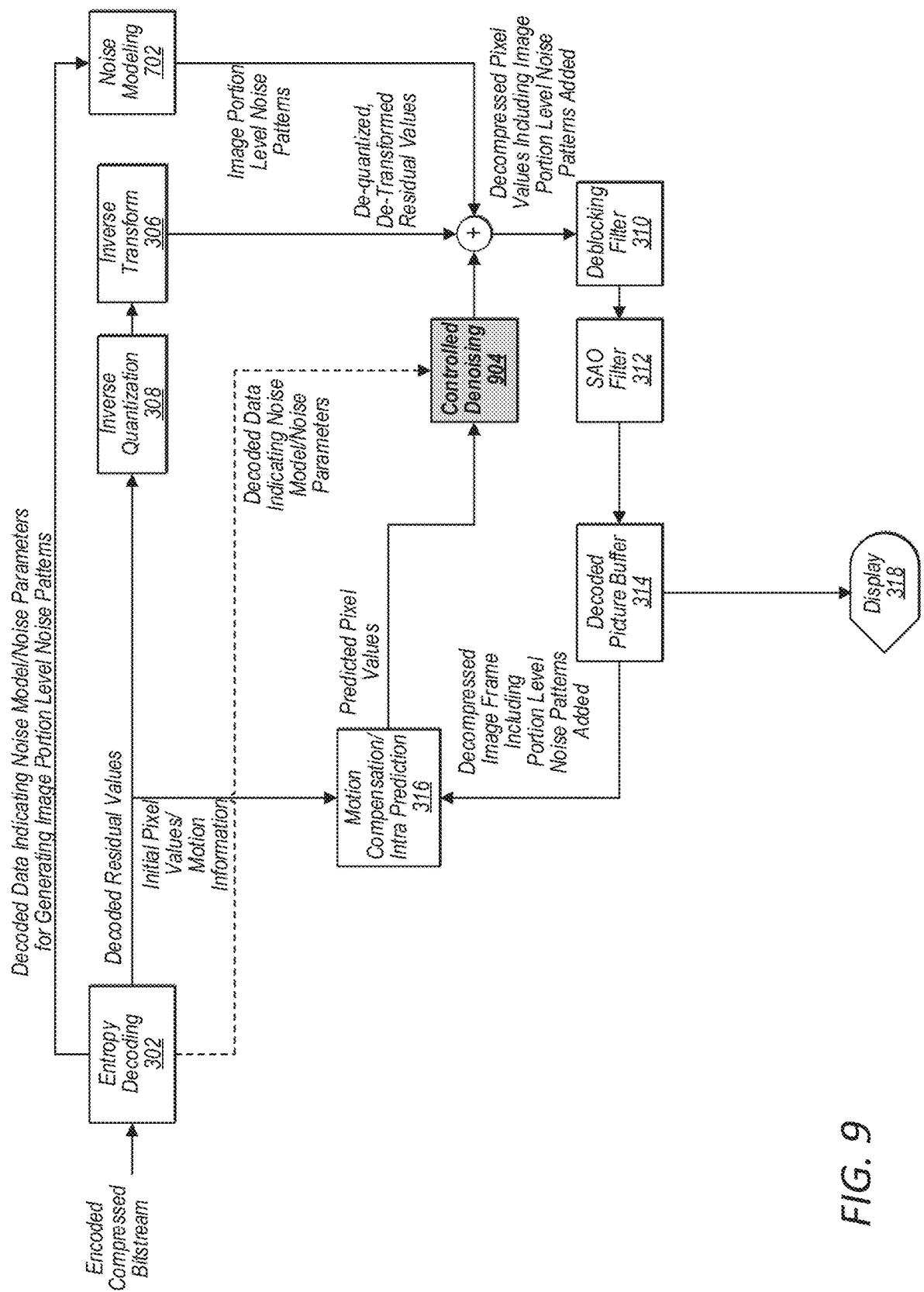
FIG. 9 illustrates an example video decoder that includes in-loop noise generation controlled at a sub-image portion granularity and that includes controlled de-noising, according to some embodiments.
Figure 10:
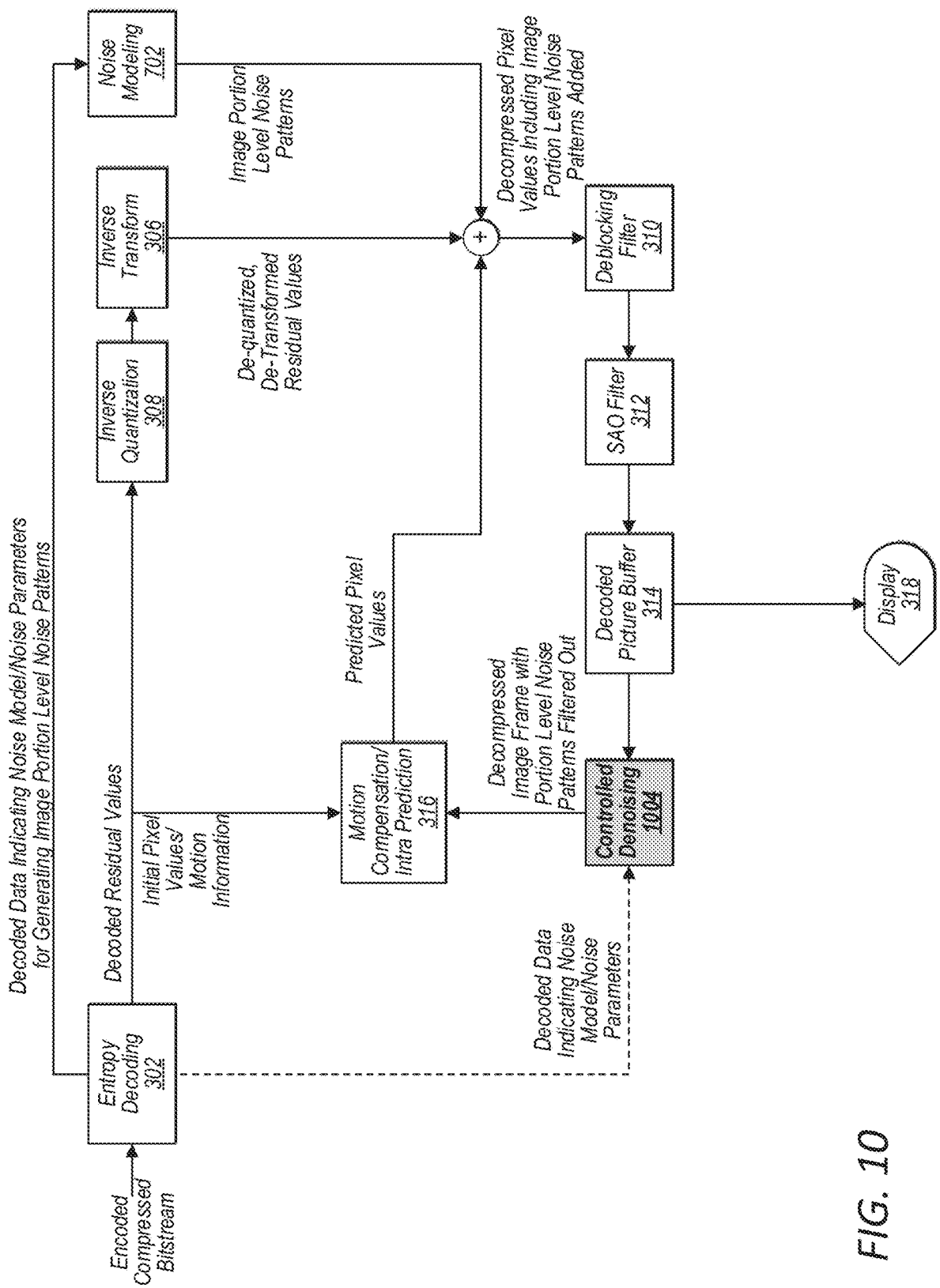
FIG. 10 illustrates an example video decoder that includes in-loop noise generation controlled at a sub-image portion granularity and that includes controlled de-noising downstream of in-loop filters, according to some embodiments.

In some scenarios added noise may hurt inter-prediction. This is because the system would have to compensate not only for the inaccuracies of prediction but also the non-correlated noise. The use of denoising methods, e.g. bilateral, Gaussian, Wiener, or other filtering schemes, may be part of the prediction loop and remove noise from the prediction signal. Such denoising methods are signaled and controlled with such signaling in both the encoder and the decoder. For example, FIG. 8 illustrates an encoder that includes a controlled denoising module 804 and FIG. 9 illustrates a decoder that includes controlled denoising module 904. Also FIG. 10 illustrates a decoder that includes a controlled denoising module 1004 that removes noise from reconstructed images used by motion compensation and intra-prediction module 316.

In some embodiments, the signaling of such controlled denoising methods could also now be based on the type and characteristics of the noise that was added. Since both the encoder and the decoder are aware of such information, the denoising could be adjusted accordingly given such characteristics, e.g. select the most appropriate mode to remove the noise, without requiring to signal all the parameters needed for the denoising of "unknowns" in terms of characteristics of the noise. For example, if noise of certain characteristics (e.g. Gaussian noise of mean value X) was added on a particular reference, then for that reference a bilateral filter may be preferred. For a different reference with different noise characteristics a Gaussian or Wiener filter may be preferred. Instead of making an implicit decision of the filter, the most probable filter mode could also be selected according to such mechanism compared to which the index of the final filter to be used is then coded. Then that would help reduce coding overhead of the denoising processing filter.

In some embodiments, in-loop noise generation and addition could be combined with out-of-loop noise generation and addition, as shown in FIGS. 2 and 3. This can help in scenarios where it might be desirable to add noise on the reconstructed signal but avoid having that noise in the prediction loop. There are multiple ways this may be done, such as:

Switch the noise mode at a higher level structure, e.g. sequence, picture, tile or slice. The noise for example could be out of the loop only, or in-loop only.

Permit both modes to be present even at the block level, but only one of them to be present at each time. In such a case, the encoder and decoder need to maintain a block map of where in-loop noise has been added already and where out of loop noise will be added later (e.g. for display purposes).

Permit both types of noise to be present but also controlled at the same time and at the block level. In this case the in-loop noise may be trying to address certain types of artifacts and may not need to be of considerable energy so as to ensure that noise does not impact inter prediction as much. The out of loop noise, on the other hand, could be more significant. In such a case the noise models for both in-loop and out-of-loop blocks would need to be considered jointly. The out of loop noise could be "blind" in terms of the in-loop noise addition, i.e. no metadata need to be fed to that block for the addition of noise, therefore reducing complexity, however it might be desirable for some systems that the in-loop noise, e.g. where it was added and with what features, is also considered for the adjustment and characteristics of the out-of-loop noise adder.

Although encoding modules based on pixel comparison operations, such as sum of absolute differences (SAD), sum of absolute transformed differences (SATD), sum of square error (SSE), etc. could be used for many of the coding decisions used by the proposed encoders (as is done with many existing encoders), it might be preferable to utilize other matching criteria that might be more "noise" agnostic/robust. Using a modified SSIM method that gives more prominence to the mean than the variance of the signal could prove more robust as a matching/decision criterion in the presence of noise, as well as transform domain criteria that highlight DC values than lower (and noisier prone) AC coefficients. in the context of a rate distortion optimized model based on lagrangian parameters the lambda parameters may be appropriately adjusted also given the distortion model as well as the characteristics of the block (motion, noise, DC, variance without noise etc.) that is currently encoded.

Different decision rules could apply for different color components or for different content, e.g. SDR vs HDR, which could be determined by the encoder, the application, or user. An encoder, for example, could use a different distortion criterion for chroma versus luma.

Example Process for Generating In-Loop Noise Patterns

Figure 11A:
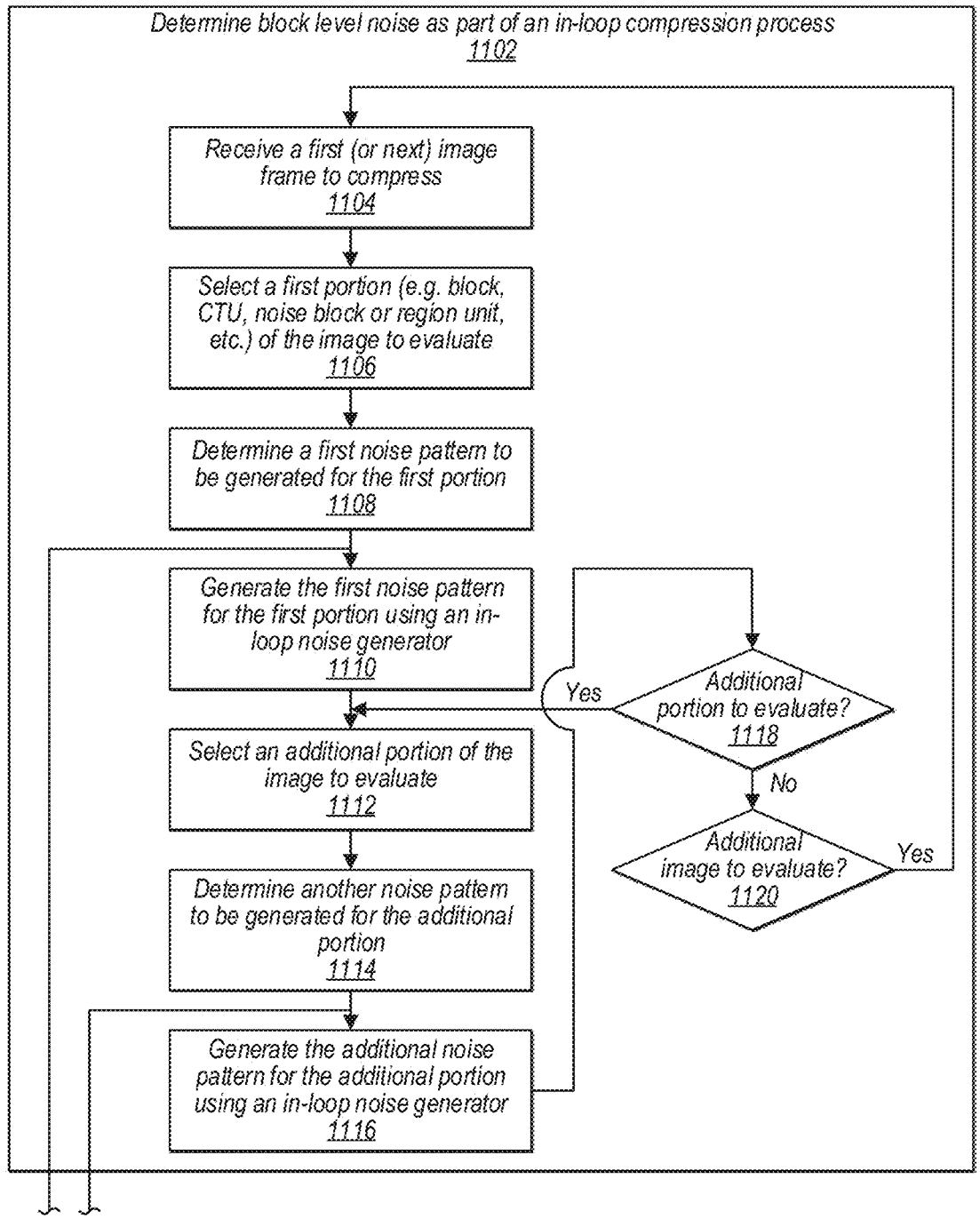
FIGS. 11A-11B illustrate a compression process with in-loop noise estimation and generation at a sub-image portion level of granularity, according to some embodiments.
Figure 11B:
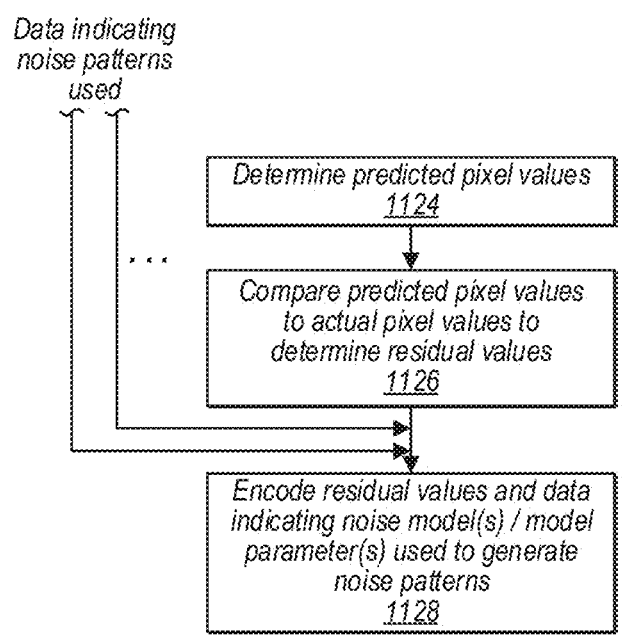

FIGS. 11A-B illustrate an example process for generating in-loop noise patterns according to some embodiments. Step 1102 is a step for determining block level noise as part of an in-loop compression process and includes sub-steps 1104-1122.

At 1104, a first or next image to be compressed is received. At 1106 a first portion (e.g. block, CTU, noise block or region unit, etc.) of the first (or next image) is selected to be evaluated for noise.

At 1106, a first noise pattern to be generated for the first portion is determined. The first noise pattern may be selected to approximate noise in the first portion of the image. At 1110, the first noise pattern is generated using a noise model and/or noise parameters determined at 1108.

At 1112, an additional (or next additional) portion (e.g. block, CTU, noise block or region unit, etc.) of the first (or next image) is selected to be evaluated for noise.

At 1114, a noise pattern to be generated for the additional (or next additional) portion is determined. The noise pattern may be selected to approximate noise in the additional portion of the image. At 1116, the noise pattern is generated using a noise model and/or noise parameters determined at 1114.

At 1118, it is determined if there is an additional portion (e.g. block, CTU, noise block or region unit, etc.) of the first (or next image) to be evaluated for noise. If so, the process continues at 1112 for the next additional portion of the first (or next) image to be compressed. If there are not any additional portions to evaluate for the image currently being evaluated, at 1120, it is determined if there is an additional image to evaluate. If so the process continues at 1104 for the next image to be evaluated.

At 1124, predicted pixel values are determined for a current portion e.g. block, CTU, noise block or region unit, etc.) of the first (or next image). At 1126, the predicted pixel values are compared to uncompressed or original pixel values to determine residual values.

At 1128, the residual values and the noise model and/or noise parameters determined at 1108 or 1114 for the given block being evaluated are encoded in an encoded bit stream. Note that noise generation and pixel value prediction and determination of residuals may be performed on a block-by-block or region-by-region basis.

Exampled Controlled De-Noising Process

Figure 14:
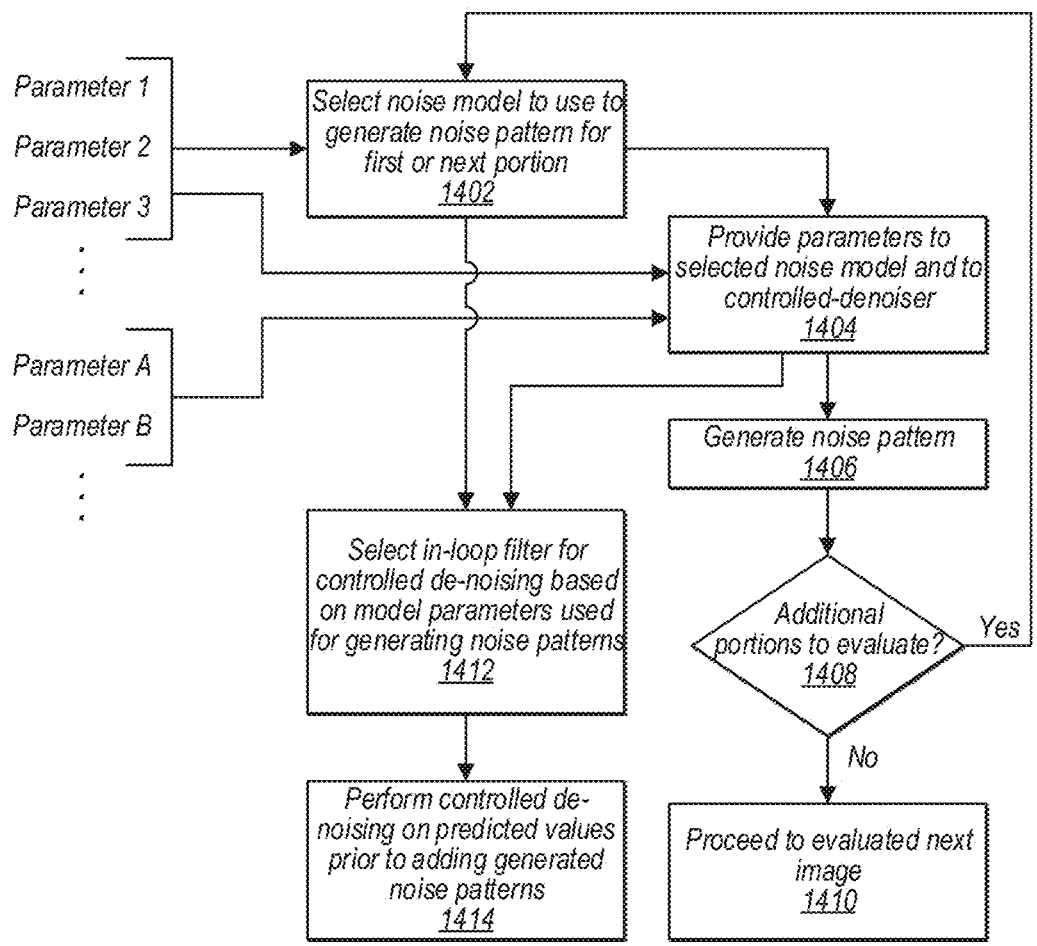
FIG. 14 illustrates an example controlled de-noising process, according to some embodiments.

FIG. 14 illustrates an example controlled de-noising process, according to some embodiments.

At 1402, a noise model to use to generate a noise pattern is selected based on various input parameters as described herein. At 1404 additional parameters that act as inputs to the selected model are provided as inputs to the model selected at 1402. At 1406 a noise pattern is generated for the first (or next portion) of the image using the selected model and selected input parameters.

Additionally, the selected model and selected input are provided to a controlled de-noising module and the controlled de-noising module selects, at 1412, an in-loop filter to use for controlled de-noising based on the selected noise model and input parameters selected at 1402 and 1404. At 1414, the controlled de-noising module performs de-noising (e.g. filtering) on the portion of the image for which noise was generated at 1406.

At 1408, it is determined if there is an additional portion of the image to evaluate; if so the process reverts to 1402. If not, the process proceeds to evaluate a next image.

Example Decoding Process with In-Loop Sub-Image Portion Level Noise Generation

Figure 15:
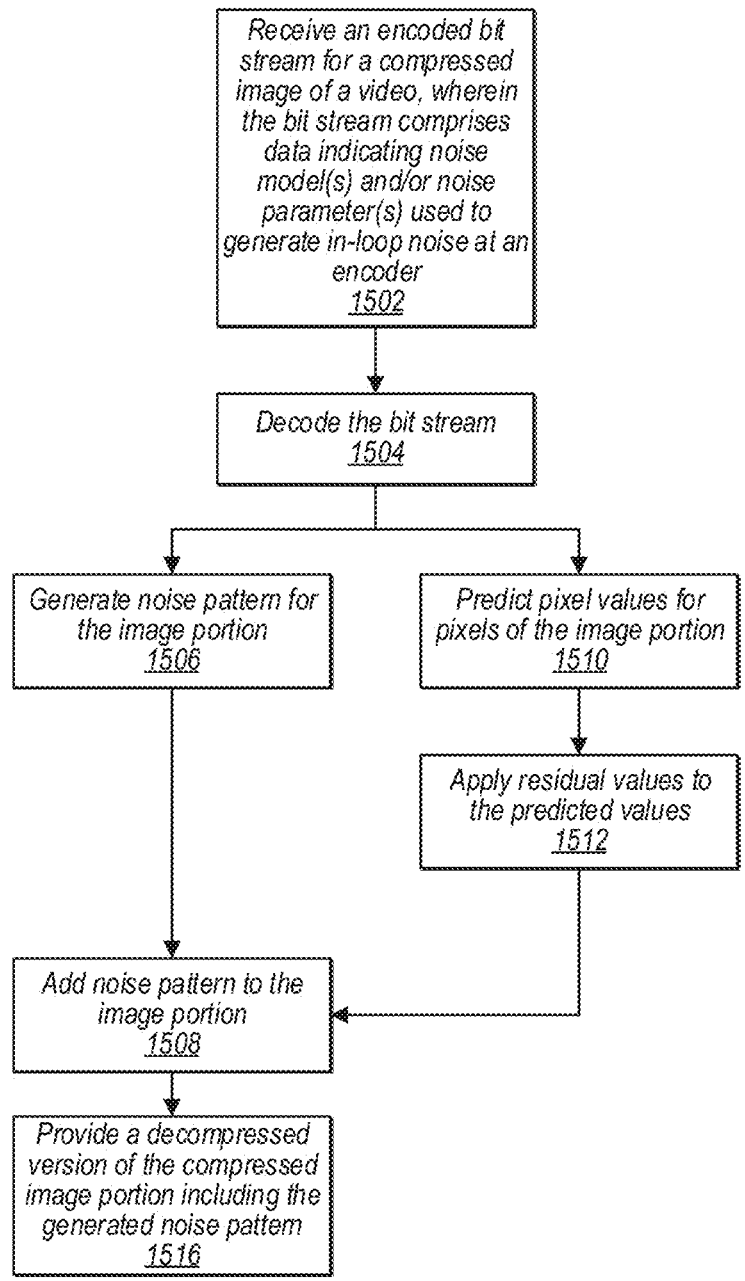
FIG. 15 illustrates an example process for generating in-loop noise patterns in a decompression process, according to some embodiments.

FIG. 15 illustrates an example process for generating in-loop noise patterns in a decompression process, according to some embodiments.

At 1502, a decoder receives an encoded bit stream for a compressed image of a video, wherein the bit stream comprises data indicating noise model(s) and/or noise parameter(s) used to generate in-loop noise at an encoder.

At 1504, the decoder decodes the compressed bit stream. This may include decoding entropy encoded residual values and decoding encoded data indicating a noise model(s) and/or noise parameters used to generate a noise pattern added in-loop in a compression process at the encoder.

At 1506, the decoder generates noise patterns for portions of an image being decompressed based on the noise models and noise parameters indicated for the respective portions (e.g. blocks, CTUs, noise block or region units, etc.) included in the compressed bit stream. Also, at 1510, the decoder predicts pixel values for the portion (e.g. block, CTU, noise block or region unit, etc.) and at 1512 applies the residual values to the predicted values to generate adjusted pixel values for the image portion.

At 1508 the generated noise pattern is added to the adjusted pixel values for the image portion. At 1516, a decompressed version of the compressed image portion is provided that includes the generated noise pattern. The decompressed image portion may be combined with other decompressed image portions to reconstruct a decompressed version of the compressed image. The decompressed version of the compressed image may be added to a decompressed picture buffer and may be used for motion estimation and/or provided for rendering at a display, such as in part of a decompressed video.

Example Computer System

Figure 16:
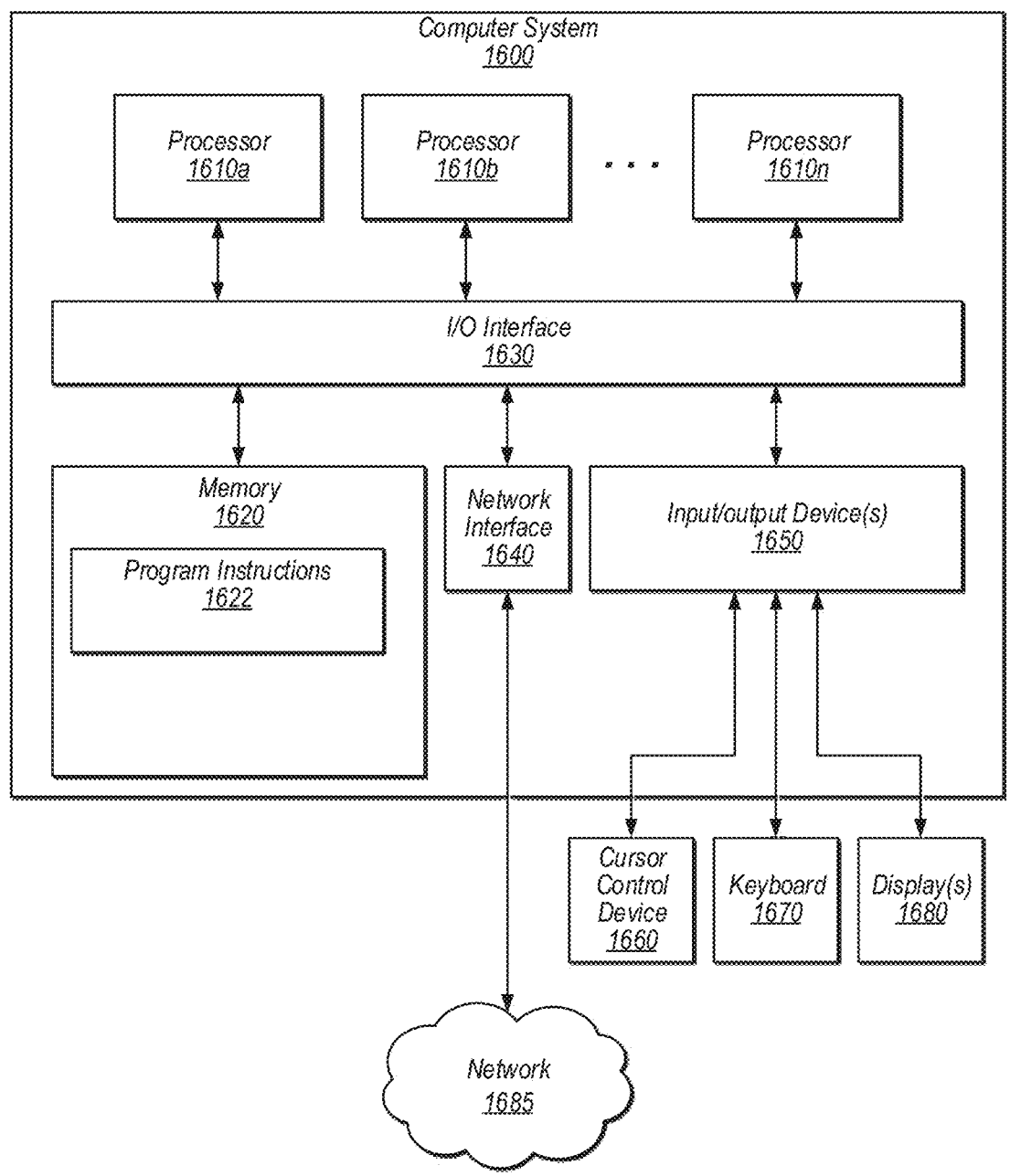
FIG. 16 illustrates an example computer system that may implement an encoder or decoder, according to some embodiments.

FIG. 16 illustrates an example computer system 1600 that may implement an encoder or decoder or any other ones of the components described herein, (e.g., any of the components described above with reference to FIGS. 1-15), in accordance with some embodiments. The computer system 1600 may be configured to execute any or all of the embodiments described above. In different embodiments, computer system 1600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of an encoder or decoder, as described herein may be executed in one or more computer systems 1600, which may interact with various other devices. Note that any component, action, or functionality described above with respect to FIGS. 1-15 may be implemented on one or more computers configured as computer system 1600 of FIG. 16, according to various embodiments. In the illustrated embodiment, computer system 1600 includes one or more processors 1610 coupled to a system memory 1620 via an input/output (I/O) interface 1630. Computer system 1600 further includes a network interface 1640 coupled to I/O interface 1630, and one or more input/output devices 1650, such as cursor control device 1660, keyboard 1670, and display(s) 1680. In some cases, it is contemplated that embodiments may be implemented using a single instance of computer system 1600, while in other embodiments multiple such systems, or multiple nodes making up computer system 1600, may be configured to host different portions or instances of embodiments. For example, in one embodiment some elements may be implemented via one or more nodes of computer system 1600 that are distinct from those nodes implementing other elements.

In various embodiments, computer system 1600 may be a uniprocessor system including one processor 1610, or a multiprocessor system including several processors 1610 (e.g., two, four, eight, or another suitable number). Processors 1610 may be any suitable processor capable of executing instructions. For example, in various embodiments processors 1610 may be general-purpose or embedded processors implementing any of a variety of instruction set architectures (ISAs), such as the x86, PowerPC, SPARC, or MIPS ISAs, or any other suitable ISA. In multiprocessor systems, each of processors 1610 may commonly, but not necessarily, implement the same ISA.

System memory 1620 may be configured to store point cloud compression or point cloud decompression program instructions 1622 and/or sensor data accessible by processor 1610. In various embodiments, system memory 1620 may be implemented using any suitable memory technology, such as static random access memory (SRAM), synchronous dynamic RAM (SDRAM), nonvolatile/Flash-type memory, or any other type of memory. In the illustrated embodiment, program instructions 1622 may be configured to implement an image sensor control application incorporating any of the functionality described above. In some embodiments, program instructions and/or data may be received, sent or stored upon different types of computer-accessible media or on similar media separate from system memory 1620 or computer system 1600. While computer system 1600 is described as implementing the functionality of functional blocks of previous Figures, any of the functionality described herein may be implemented via such a computer system.

In one embodiment, I/O interface 1630 may be configured to coordinate I/O traffic between processor 1610, system memory 1620, and any peripheral devices in the device, including network interface 1640 or other peripheral interfaces, such as input/output devices 1650. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices attached to a network 1685 (e.g., carrier or agent devices) or between nodes of computer system 1600. Network 1685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1650 may, in some embodiments, include one or more display terminals, keyboards, keypads, touchpads, scanning devices, voice or optical recognition devices, or any other devices suitable for entering or accessing data by one or more computer systems 1600. Multiple input/output devices 1650 may be present in computer system 1600 or may be distributed on various nodes of computer system 1600. In some embodiments, similar input/output devices may be separate from computer system 1600 and may interact with one or more nodes of computer system 1600 through a wired or wireless connection, such as over network interface 1640.

As shown in FIG. 16, memory 1620 may include program instructions 1622, which may be processor-executable to implement any element or action described above. In one embodiment, the program instructions may implement the methods described above. In other embodiments, different elements and data may be included. Note that data may include any data or information described above.

Those skilled in the art will appreciate that computer system 1600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1600 may be transmitted to computer system 1600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method for decoding compressed video image data, the method comprising:
   receiving an encoded bit stream for a compressed image of a video;
   generating, via an in-loop noise generator, a first noise pattern to be added to a first portion of a decompressed version of the compressed image and a second noise pattern to be added to a second portion of the decompressed version of the compressed image, at least part of the second portion being different from the first portion of the decompressed version of the compressed image;
   adding the first noise pattern to predicted pixel values corresponding to the first portion of the decompressed version of the compressed image; and
   adding the second noise pattern to predicted pixel values corresponding to the second portion of the decompressed version of the compressed image;
   wherein the first noise pattern and the second noise pattern are added to predicted pixel values that have been adjusted based on decoded residual pixel values included in the bit stream, wherein the adjusted predicted pixel values have been filtered by one or more in-loop filters of a decompression process prior to the first and second noise pattern being added.

2. The method of claim 1, wherein the encoded bit stream comprises data indicating a noise model or noise parameters to be used to generate noise for the first and second portions of the decompressed version of the compressed image.

3. The method of claim 2, further comprising generating, via the in-loop noise generator, based on the data indicating the noise model or noise parameters, the first noise pattern and the second noise pattern.

4. The method of claim 1, wherein the first noise pattern and the second noise pattern are added to the predicted pixel values at an image block level, wherein different noise pattern values are added to different blocks of the decompressed version of the compressed image.

5. The method of claim 1, wherein the first noise pattern and the second noise pattern are added to the predicted pixel values at a noise portion level, wherein each noise portion of the decompressed version of the compressed image overlaps two or more blocks of the decompressed version of compressed image, and wherein different noise pattern values are added to different ones of the noise portions of the decompressed version of the compressed image.

6. The method of claim 1, wherein the first noise pattern and the second noise pattern are added to the predicted pixel values prior to the predicted pixel being filtered by one or more in-loop filters of a decompression process.

7. The method of claim 1, further comprising:
   predicting pixel values for the compressed image;
   filtering noise from predicted pixel values; and
   applying residual values to the predicted values to determine decompressed pixel values,
   wherein noise filtered predicted values are used along with residual pixel values and the first and second noise patterns to generate the decompressed version of the compressed image.

8. The method of claim 1, further comprising:
   filtering noise from a decompressed version of another compressed image included in an adjacent frame of the video, prior to using the decompressed version of the other compressed image in a motion estimation process to determine estimated motion between the images, wherein noise is filtered from the decompressed version of the other compressed image using one or more filters selected based on noise models selected to generate a first noise pattern and a second noise pattern for the decompressed version of the other compressed image.

9. A system configured to decode compressed video image data, the system comprising:
one or more processors; and
one or more memories storing program instructions, that when executed on or across the one or more processors, cause the one or more processors to:
receive an encoded bit stream for a compressed image of a video;
generate, via an in-loop noise generator, a first noise pattern to be added to a first portion of a decompressed version of the compressed image and a second noise pattern to be added to a second portion of the decompressed version of the compressed image, at least part of the second portion being different from the first portion of the decompressed version of the compressed image;
add the first noise pattern to predicted pixel values corresponding to the first portion of the decompressed version of the compressed image; and
add the second noise pattern to predicted pixel values corresponding to the second portion of the decompressed version of the compressed image;
wherein the first noise pattern and the second noise pattern are added to the predicted pixel values at a noise portion level, wherein each noise portion of the decompressed version of the compressed image overlaps two or more blocks of the decompressed version of compressed image, and wherein different noise pattern values are added to different ones of the noise portions of the decompressed version of the compressed image.

10. The system of claim 9, wherein the encoded bit stream comprises data indicating a noise model or noise parameters to be used to generate noise for the first and second portions of the decompressed version of the compressed image, and wherein the program instructions, when executed on or across the one or more processors, cause the one or more processors to generate, via the in-loop noise generator, based on the data indicating the noise model or noise parameters, the first noise pattern and the second noise pattern.

11. The system of claim 9, wherein the first noise pattern and the second noise pattern are added to the predicted pixel values at an image block level, wherein different noise pattern values are added to different blocks of the decompressed version of the compressed image.

12. The system of claim 9, wherein the first noise pattern and the second noise pattern are added to the predicted pixel values prior to the predicted pixel being filtered by one or more in-loop filters of a decompression process.

13. The system of claim 9, wherein the first noise pattern and the second noise pattern are added to adjusted predicted pixel values that have been adjusted based on decoded residual pixel values included in the bit stream, wherein the adjusted predicted pixel values have been filtered by one or more in-loop filters of a decompression process prior to the first and second noise pattern being added.

14. The system of claim 9, wherein the program instructions, when executed on or across the one or more processors, cause the one or more processors to:
predict pixel values for the compressed image;
filter noise from predicted pixel values; and
apply residual values to the predicted values to determine decompressed pixel values,
wherein noise filtered predicted values are used along with residual pixel values and the first and second noise pattern to generate the decompressed version of the compressed image.

15. The system of claim 9, wherein the program instructions, when executed on or across the one or more processors, cause the one or more processors to:
filter noise from a decompressed version of another compressed image included in an adjacent frame of the video, prior to using the decompressed version of the other compressed image in a motion estimation process to determine estimated motion between the images, wherein noise is filtered from the decompressed version of the other compressed image using one or more filters selected based on noise models selected to generate a first noise pattern and a second noise pattern for the decompressed version of the other compressed image.

16. A method for encoding video image data, the method comprising:
selecting a first portion of an image of a video;
determining a first noise pattern to be added to the first portion of the image;
selecting a second portion of the image, at least part of the second portion being different from the first portion of the image;
determining a second noise pattern to be added to the second portion of the image;
generating, via a noise generator included in a compression loop for compressing pixel value data for the image, the first noise pattern and the second noise pattern, wherein the first and second noise patterns are different; and
compressing the pixel value data for the image based at least in part on the first noise pattern and the second noise pattern;
wherein the first noise pattern and the second noise pattern are to be added to adjusted predicted pixel values that have been adjusted based on residual pixel values, wherein the adjusted predicted pixel values have been filtered by one or more in-loop filters of a compression process prior to the first and second noise pattern being added.

17. The method of claim 16, further comprising encoding the compressed pixel value data for the image, wherein an encoded bit stream for the compressed pixel value data includes data indicating a noise model or one or more noise parameters.

18. The method of claim 16, wherein the first noise pattern and the second noise pattern are added to prediction residuals used in the compression loop as part of an in-loop inter-prediction or intra-prediction process.

* * * * *